US009380309B2

(12) United States Patent
Huang et al.

(10) Patent No.: US 9,380,309 B2
(45) Date of Patent: Jun. 28, 2016

(54) MOTION ANALYSIS METHOD AND CODE STREAM CONVERSION METHOD BASED ON VIDEO COMPRESSION CODE STREAM AND APPARATUS THEREOF

(75) Inventors: Chongji Huang, Hangzhou (CN); Hai Yu, Hangzhou (CN); Hui Su, Hangzhou (CN); Yonghua Jia, Hangzhou (CN)

(73) Assignee: HANGZHOU HIKVISION DIGITAL TECHNOLOGY CO. LTD, Hangzhou (CN)

( * ) Notice: Subject to any disclaimer, the term of this patent is extended or adjusted under 35 U.S.C. 154(b) by 0 days.

(21) Appl. No.: 14/358,897

(22) PCT Filed: Dec. 19, 2011

(86) PCT No.: PCT/CN2011/084214
§ 371 (c)(1),
(2), (4) Date: Feb. 20, 2015

(87) PCT Pub. No.: WO2013/071669
PCT Pub. Date: May 23, 2013

(65) Prior Publication Data
US 2015/0163493 A1   Jun. 11, 2015

(30) Foreign Application Priority Data

Nov. 18, 2011 (CN) .......................... 2011 1 0369324

(51) Int. Cl.
*H04N 19/139* (2014.01)
*H04N 19/124* (2014.01)
(Continued)

(52) U.S. Cl.
CPC ............ *H04N 19/139* (2014.11); *G06T 7/2006* (2013.01); *G06T 7/2033* (2013.01);
(Continued)

(58) Field of Classification Search
CPC combination set(s) only.
See application file for complete search history.

(56) References Cited

U.S. PATENT DOCUMENTS 6,618,507 B1 * 9/2003 Divakaran ......... G06F 17/30811
382/236
7,321,624 B1 * 1/2008 Allmen ................ H04N 19/172
375/240.08
(Continued)

FOREIGN PATENT DOCUMENTS

CN          101305339 A       11/2008
CN          101494785 A        7/2009
(Continued)

*Primary Examiner* — Christopher S Kelley
*Assistant Examiner* — Asmamaw G Tarko
(74) *Attorney, Agent, or Firm* — Fish & Richardson P.C.

(57) ABSTRACT

The present invention relates to security video monitoring for and discloses a motion analysis method and a code stream conversion method based on video compression code stream and apparatus thereof. In the invention, a total number of bits or a residual bit number of a macro block in a video I frame is extracted from the video compression code stream; weighted average is performed to the total number of bits or a residual bit number of the macro block whose position corresponds with the current macro block in the latest M frames and a background value is obtained through calculating; a difference value between the total number of bits or the residual bit number of the current macro block and the background value is calculated, and if the difference value is greater than a predetermined first threshold, then a moving object is determined to be detected. Weighted average background modeling is performed to macro block information, such as the total numbers of bits or the residual bit number of the macro block corresponds with the current macro block in latest M frames. Threshold determination is performed to a background difference value matching result and motion analysis is performed. Coding picture of the macro block between the frames does not need to be calculated. Calculated quantity is small and the adaptability to the code stream and a scene is strong.

18 Claims, 13 Drawing Sheets

(51) Int. Cl.
*H04N 19/176* (2014.01)
*H04N 19/20* (2014.01)
*H04N 19/48* (2014.01)
*G06T 7/20* (2006.01)
*H04N 19/51* (2014.01)
*H04N 19/40* (2014.01)
*H04N 19/132* (2014.01)
*H04N 19/137* (2014.01)
*H04N 19/177* (2014.01)
*H04N 19/174* (2014.01)

(52) U.S. Cl.
CPC .......... *H04N19/124* (2014.11); *H04N 19/176* (2014.11); *H04N 19/40* (2014.11); *H04N 19/48* (2014.11); *H04N 19/51* (2014.11); *G06T 2207/10016* (2013.01); *G06T 2207/20021* (2013.01); *H04N 19/132* (2014.11); *H04N 19/137* (2014.11); *H04N 19/174* (2014.11); *H04N 19/177* (2014.11); *H04N 19/20* (2014.11)

(56) References Cited

U.S. PATENT DOCUMENTS

| | | | | |
|---|---|---|---|---|
| 2005/0147170 | A1* | 7/2005 | Zhang | G06K 9/00711 375/240.16 |
| 2006/0227870 | A1* | 10/2006 | Tian | G06T 9/00 375/240.03 |
| 2010/0142616 | A1* | 6/2010 | Hegde | H04N 21/6437 375/240.15 |
| 2011/0032352 | A1* | 2/2011 | Kanda | G06T 7/0044 348/142 |
| 2011/0182254 | A1 | 7/2011 | Kim et al. | |
| 2014/0119602 | A1* | 5/2014 | Zuo | G06T 7/2033 382/103 |

FOREIGN PATENT DOCUMENTS

| | | |
|---|---|---|
| CN | 101815218 A | 8/2010 |
| EP | 2 128 859 | 12/2009 |
| WO | 2007/140724 | 12/2007 |

* cited by examiner

MOTION ANALYSIS METHOD AND CODE STREAM CONVERSION METHOD BASED ON VIDEO COMPRESSION CODE STREAM AND APPARATUS THEREOF

FIELD OF THE INVENTION

The present invention relates to security video monitoring, in particular a video processing technology.

BACKGROUND OF THE INVENTION

With the rapid development of video monitoring technology, requirement of the users for monitoring system is getting higher and higher. A very significant point is that they expect the monitoring system can provide more intelligent functions. Video motion analysis function is a very basic and important function among the various intelligent functions. The so-called video motion analysis means detecting screen changes of specific area and moving objects in video screens of specific video scenes and eliminating interference from normal light change and noise, and then providing useful information for subsequent alarm, target classification and target tracking.

In the video code stream motion analysis of the prior technology, such as a Chinese Patent No. CN03103526.4 discloses an analysis method based on the average size of inter-frame coding picture. The motion information is detected by calculating average size of video frames which is inter-frame coded and change rate of the average size in the above patent. The inventors of the present invention have found that: first of all, as influenced by code-rate control module in code stream encoding, even static code streams of two neighboring frames may have larger difference in size because the difference of the used quantized coefficients may be greater, whereas all video frames are coded only using one same quantized coefficient and only video that contain a large amount of motion information can be effectively detected in this method. For the above, the method in above patent can cause faulty motion determination. Secondly, if there are slowly moving objects exist in the video and the sizes of these objects account for a smaller proportion of the total picture, the moving objects are unable to effectively detect by the method as size of the code stream does not change significantly, when the sequence is encoded using the same quantized coefficient. Last, the determination of this method is based on size of code stream of the whole picture, which is unable to detect areas happened movement and direction of moving object, though it can detect if there exists a moving object in video. In a word, the method can only accomplish simple motion detection, but is unable to adapt various coded code stream and scenarios.

The inventors of the present invention also found that coding end can provide limited information and process limited computation in the video motion analysis method using coding ends information in prior art. Therefore, the accuracy is not high and this kind of methods have rigorous requirement for video scenes and most of them can only be applied for simple indoor scenes instead of complicated outdoor scenes. Similarly, the video motion analysis method based on decoding pictures figures out decoding pictures by decoding compressed code stream and then counts pixel features of the decoding pictures and performs motion analysis according to these features, therefore the defect of this kind of methods is that a great deal of computation and larger storage space are needed for computing coding pictures and performing motion analysis on decoding pictures, which result in a difficult in achieving real-time processing result. On the other hand, its operation accuracy is low because most of decoding pictures are distorted.

The inventors of the present invention also found that there exist following methods to implement video code stream conversion method and overcome its defect in prior conversion technology:

Firstly, dual code stream method. One code stream with lower resolution or frame rate is coded in this kind of method besides coding one code stream with normal resolution and frame rate. The two code streams are used for storage and network forwarding, respectively. Load of coding end and transmission load from coding end to receiving end increased as two code streams need to be coded while code stream with lower resolution and frame rate may lead to key information missing.

Secondly, transcoding storage method. This kind of methods transform received code stream to code stream with lower resolution or frame rate by a specific algorithm, so as to reduce required storage space when storing a code stream. Transcoding process is added to receiving apparatus in the method which have to consume greater calculated quantity. Moreover, transcoded code stream will inevitably cause missing of information of the picture as its low frame rate and resolution.

Thirdly, code stream extraction method. This kind of methods extract coding code stream corresponding to some frames or field for reference out of video code stream and discard coding code stream corresponding to other frames or field not for reference. The method has less calculated quantity than above two methods. However, it still has a problem of information missing as discarded frames may contain key motion information.

Otherwise, as IP cameras provide more information by providing pictures with increasing high resolution and frame rate in monitoring field, transmission and processing of the video code stream lead to severe pressure on network bandwidth and storage.

Therefore, how to achieve more effectively, stronger and wider range video motion analysis and how to reduce pressures of network bandwidth and storage caused by video code stream are urgent problems for people to solve.

SUMMARY OF THE INVENTION

The purpose of the present invention is to provide a motion analysis method and a code stream conversion method based on video compression code stream and apparatus thereof, which have no need to calculate coding picture of inter macro block and have less calculated quantity and a strong adaptability for coding code stream and scenes.

Embodiments of the present invention disclose a motion analysis method based on video compression code stream to solve above technical problems, including following steps:

a total number of bits or a residual bit number of a macro block in a video frame is extracted from the video compression code stream;

weighted average is performed to the total number of bits or the residual bit number of the macro blocks whose positions correspond with the current macro block in latest M frames and a background value is obtained through calculating, in which M is a natural number;

difference value between the total number of bits or the residual bit number of the current macro block and the background value is calculated, and if the difference value is greater than the predetermined first threshold, then a moving object is determined that has been detected.

Embodiments of the present invention further disclose a code stream conversion method based on video compression code stream, including following steps:

the motion analysis is implemented on the video compression code stream according to any one of the motion analysis methods mentioned above;

if the motion analysis determination is that the moving object has been detected, code stream in group of picture of the detected moving object is outputted, otherwise code stream of pictures represented I frame in group of picture of undetected moving object is outputted.

Embodiments of the present invention further disclose a motion analysis apparatus based on video compression code stream, including following units:

a first extraction unit is configured to extract a total number of bits or a residual bit number of a macro block in a video frame from the video compression code stream;

a weighting unit is configured to perform weighted average to the total number of bits or the residual bit number of macro blocks whose positions correspond with current macro block in the latest M frames and to obtain a background value through calculating, in which M is a natural number;

a calculation unit is configured to calculate a difference value between the total number of bits or the residual bit number of the current macro block and the background value obtained from the weighting unit through calculating;

a first determination unit is configured to determine whether the difference value calculated by the calculation unit is greater than predetermined first threshold, and then determine that a moving object has been detected if the difference value is greater than the predetermined first threshold.

Embodiments of the present invention further disclose a code stream conversion apparatus based on video compression code stream, including following units:

the motion analysis apparatus described above.

a motion code stream outputting unit for outputting code stream in group of picture of the detected moving object if the motion analysis of the motion analysis apparatus determines that moving object has been detected, otherwise outputting code stream of pictures represented I frame in group of picture of undetected moving object.

Comparing to prior art, the main differences and effects of the embodiments in the present invention are:

Weighted average background modeling is performed to macro block information, such as the total number of bits or the residual bit number of the macro block and the like, wherein the position of the macro block corresponds with the current macro block of the P frame or the B frame in the latest M frames. Threshold determination is performed to a background difference value matching result and motion analysis is performed. Coding picture of the inter macro block does not need to be calculated. Calculated quantity is small and the adaptability to the coding code stream and a scene is strong.

Without calculating coded picture of the inter macro block, I frame's picture can be reconstructed according to macro block information of I frame and normalization processing, background modeling and model matching can be implemented according to macro block information of P frame and/or B frame. Moreover, the background modeling method base on macro block information of compressed code stream has a strong adjustability for coding code stream and scenes, which can detect areas and directions happened motion in pictures with a small calculated quantity and quickly get motion areas and directions by easily and effectively eliminating the influence of noise and light in various scenes to deal with all kinds of complicated indoor and outdoor scenes.

By only rebuilding picture of I frame instead of P frame or B frame, it can omit some procedures having no serious influence on quality of the I picture to save calculated quantity, such as loop filtering.

Video compression code stream can be filtered or transcoded by combining code stream conversion and motion analysis result, which can reduce pressure of network bandwidth and storage caused by incremental video compression code stream.

Code stream can be converted by directly using the result of the motion analysis without cost a great deal of calculated quantity, which can keep information of original pictures and reduce pressure of network bandwidth and storage caused by incremental code stream.

Furthermore, by remapping residual information in process of compressing video code stream, influence due to different quantization parameters or different quantization algorithms can be eliminated, which can further improve accuracy of the motion analysis.

Furthermore, classification of the macro block is merged into the normalized processing on intra and inter macro blocks and the preprocessing procedure of macro block information in remapping processing, which enables the macro block information can be expressed in a unified form to facilitate sequential motion analysis.

Furthermore, the accuracy of the motion analysis can be further improved by utilizing motion vector as a supplementary determination criterion.

Furthermore, motion vector of the current macro block can be obtained by weighted average filtering the motion vectors of different type of macro blocks, which forms a unified expression of the motion vector to facilitate sequential motion analysis.

Furthermore, by adding macro block determination in designated area to the motion analysis method based on video compression code stream, the macro block of designated area can be automatically and quickly located, and the subsequent background value of the macro block will not be calculated if it is not the macro block of the designated area, which will save unnecessary system overhead.

Furthermore, by adding determination of directed motion vector to the motion analysis method based on video compression code stream, the macro block of designated direction can be automatically and quickly located, and the subsequent background value of the macro block will not be calculated if it is not the macro block of the designated direction, which will save unnecessary system overhead as well as time and energy in practical application, such as the video compression motion analysis, etc.

Furthermore, motion area and direction in the picture can be detected by normalized processing and background modeling for macro block information only in P frame and B frame and detecting moving objects using the background model. This method has a small calculated quantity and can easily and effectively eliminate the influence of noise and light in various scenes to deal with all kinds of complicated indoor and outdoor scenes. It also can quickly get designated motion area and direction to save calculated quantity.

DETAILED DESCRIPTION OF THE PREFERRED EMBODIMENTS

The following description provides plenty of technical details for a better understanding. Those who skilled in the art will understand, however, these technical solutions required to be protected in the claims of the present invention can be practiced without many of these specific technical details and all kinds of changes and modifications in following embodiments.

Embodiments of the present invention will be further described in detail so that the purpose, technical solution and advantages of the present invention can become clearer.

Figure 1:
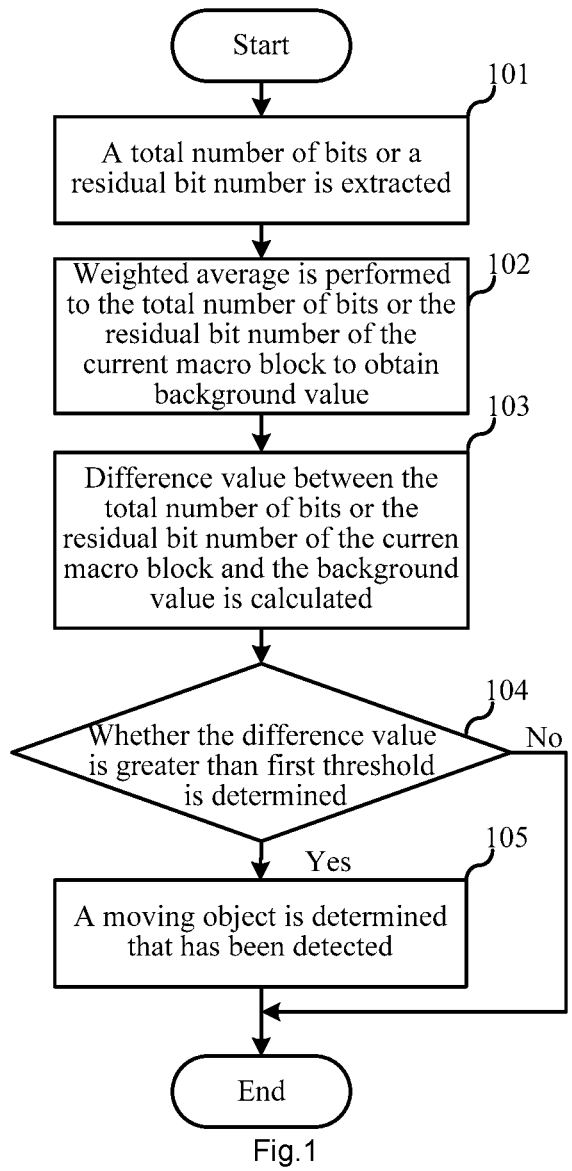
FIG. 1 shows a flow chart of a motion analysis method based on video compression code stream in the first embodiment of the present invention.

The first embodiment of the present invention relates to a motion analysis method based on video compression code stream. FIG. 1 is the flow chart of the motion analysis method based on video compression code stream. Specifically, as shown in FIG. 1, the motion analysis method base on video compression code stream includes following steps:

In step 101, a total number of bits or a residual bit number of a macro block in a video frame is extracted from video compression code stream. Frame is the base unit when progressive scanning video in video compression code stream. Field is the base unit consisted of all odd or even lines when interlaced scanning video. One picture can be one frame or one field. Rate of the video processing in frame is called frame rate. Pixel is a basic unit of digital picture and each pixel is a sampling point on the picture which characterizes information of the picture on position of the pixel, such as light intensity, etc. A black and white picture consists of X×Y brightness sampling points (X is horizontal and Y is vertical), wherein X is called horizontal resolution, and Y is called vertical resolution, or both are collectively called resolution. A color picture consists of several two-dimensional planes characterizing information such as representation brightness, chroma, etc, which often includes three planes, that is, brightness Y, blue color difference Cb and red color difference Cr.

In video compression algorithm, neighboring movements pictures may exist a large number of similar region and one of these pictures can reference another picture (or several other pictures), so that it is only need to process difference between former picture and later picture when compressing the former one, so as to reduce the amount of data. This kind of coding mode is called inter-frame coding. If whole or part of a picture is coded without using above inter-frame coding, this coding mode is called intra-frame coding. Data of the intra-frame coding do not refer to other data in time dimension. For example, video compression standard algorithm defined by H.264/AVC is a main video compression algorithm in international security video monitoring application of present.

When coding video data, each picture is divided into 16×16 non-overlapping brightness pixels and macro blocks corresponding to area chroma pixels, which are basic process units in video data coding. In general, brightness block is a 16×16 pixel block while size of two chroma picture pixel blocks is determined according to sample format of its picture, such as, for YUV420 sample picture, its chroma block is the 8×8 pixel block. In each picture, several macro blocks are arrayed to a slice form and the picture is coded block by block to form a continuous video code stream. Wherein, macro block information includes classification of macro block, coding total number of bits, motion vector, and quantization parameter of macro block, etc. In addition, macro blocks of each picture can be further divided into sub-macro blocks as the basic unit of video coding, such as 16×8, 8×16, 8×8 and 4×4 sub-macro blocks. Processing unit is not restricted to 16×16 block in the present invention. Sub-division can be used as processing unit when using this method, wherein, intra macro block is formed by intra-frame coding mode and inter macro block is formed by inter-frame coding mode.

In order to eliminate time redundancy when coding video data, if macro block is coded using inter-frame coding mode, motion vector (its abbreviation is MV) is indicated by position motion offset having minimum difference between the macro block and this macro block's former picture (or former and later). In a two-dimensional, the offset, i.e. motion vector is represented as two components with different direction (MVx, MVy), which includes information parameters like motion direction, etc.

Not every macro block can find its same position in former (or former and later) pictures, so a massage indicated specific difference value of every pixel exists besides motion offset, i.e. residuals or residual bit number.

In order to filter part of insensitive information for human eyes and reduce date quantity, a step of quantifying residual information using quantization parameter (its abbreviation is QP) exists in coding process. However, quantization can cause distortion and quantization parameter is usually a parameter used in quantization, in which the greater parameter is, the greater picture distortion will be generated.

Code stream of a picture only coded by inter-frame coding mode is called I frame code stream, which can be decoded and get picture without depending on its former code stream. It has to start with an I picture when decoding video compression code stream. When applying video monitoring, I picture usually emerges at a specific interval, such as 1 second or several seconds, which is propitious to random access and access operation, such as scrollbar dragging in video playing, etc.

Code stream of the picture whose whole or part region is coded by intra-frame coding mode is called P frame or B frame, which can be decoded and get picture depending on its former code stream. As P frame or B frame utilize previous data as their reference, their compression rates are higher than I frame's.

A video code stream consisting of all P frame pictures or B frame pictures between one I picture (which is included) and its next I picture is called a group of picture (its abbreviation is GOP).

Similar to I picture and P picture or B picture mentioned above, every macro block in P picture or B picture can be classified to intra macro block and inter macro block. Only intra macro blocks exist in I picture, wherein an intra macro block is formed using intra-frame coding mode and a inter macro block is formed using inter-frame coding mode.

Then the process proceeds to step 102. Weighted average is performed to the total number of bits or the residual bit number of macro blocks whose positions correspond with the current macro block in the latest M frames and a background value is obtained through calculating, in which M is a natural number.

Weighted average background modeling is performed to macro block information, such as the total number of bits or the residual bit number of the macro block and the like, wherein the position of the macro block corresponds with the current macro block of the P frame or the B frame in the latest M frames. Threshold determination is performed to a background difference value matching result and motion analysis is performed. Coding picture of the inter macro block does not need to be calculated. Calculated quantity is small and the adaptability to the coding code stream and a scene is strong.

By only rebuilding picture of I frame instead of P frame or B frame, it can omit some procedures having no serious influence on quality of the I picture to save calculated quantity, such as loop filtering.

Then the process proceeds to step 103. Difference value between the total number of bits or the residual bit number of the current macro block and the background value is calculated.

When calculating the difference rsd_dif between the total number of bits or the residual bit number block_rsd of the current macro block and the background value bg_avg_rsd, the difference measure method between the residual bit number and the background value can utilize absolute difference rsd_dif=|block_rsd−bg_avg_rsd| between the residual bit number block_rsd and the background value bg_avg_rsd in current macro blocks of both number, but not restrict to the absolute value measure method, which can be such as the square root of the difference, etc.

Then the process proceeds to step 104. Whether the difference value between the total number of bits or the residual bit number of the current macro block and the background value is greater than predetermined first threshold is determined.

If the difference value between the total number of bits or the residual bit number of the current macro block and the background value is greater than the predetermined first threshold, the process proceeds to step 105; otherwise, this process ends.

In step 105, if the difference value between the total number of bits or the residual bit number and the background value is determined to be greater than the predetermined first threshold, a moving object is determined that has been detected in the current macro block. Then the process ends.

The second embodiment of the present invention relates to a motion analysis method based on video compression code stream.

The second embodiment is improved based on the first embodiment. The main improvement is: quantifying residual information in process of compressing video code stream, which can filter part of insensitive information for human eyes and reduce date quantity to improve compression effect when picture distortion has no obvious influence on the motion analysis result. Classification of the macro block is merged into a normalized processing on intra and inter macro blocks and a preprocessing procedure of macro block information in remapping processing, which enables the macro block information can be expressed in a unified form to facilitate sequential motion analysis.

After the step 101 that a total number of bits or a residual bit number of a macro block in a video frame is extracted from video compression code stream, the method includes following step:

A total number of bits or a residual bit number of a macro block is remapped to the total number of bits or the residual number being independent with quantization parameter according to quantization algorithm defined by compression standard of the video compression code stream.

Before the step of the remapping, the method includes following steps:

Classification of the macro block is merged into inter macro block and intra macro block according to the compression standard of the video compression code stream.

In the step of the remapping, the total number of bits or the residual bit number of the macro block is remapped to the total number of bits or the residual bit number being independent with the quantization parameter according to the quantization algorithm defined by the compression standard of the video compression code stream and the classification of the macro block.

Figure 2:
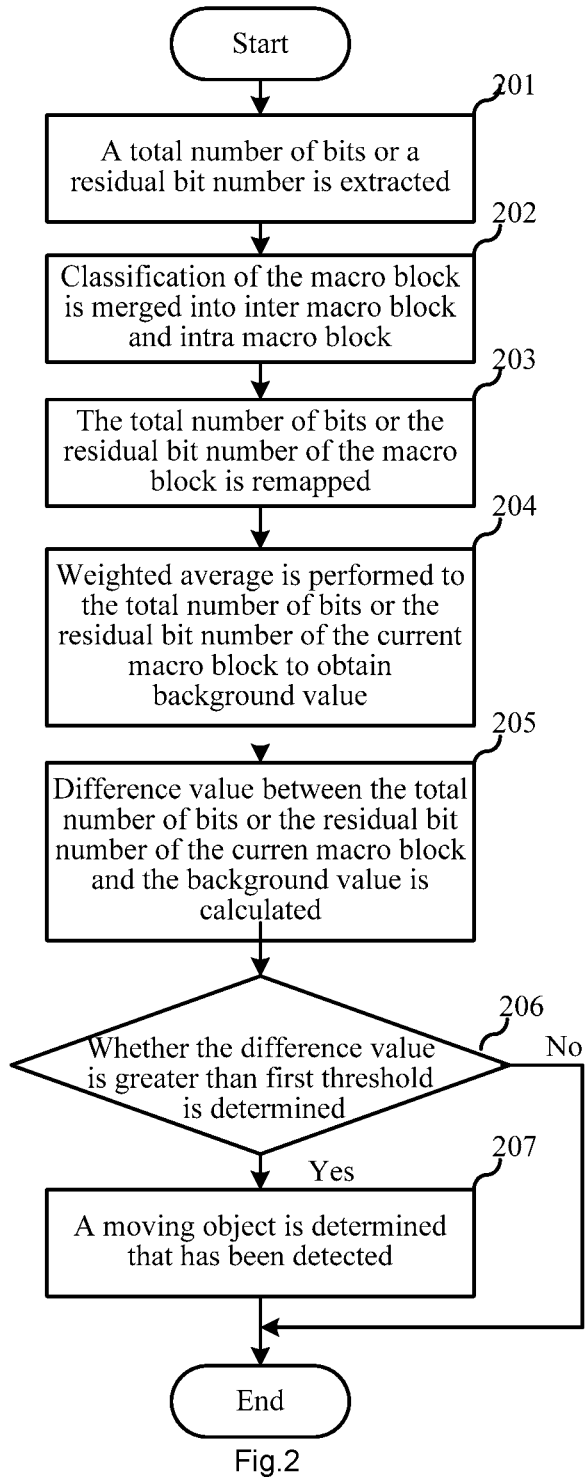
FIG. 2 shows a flow chart of a motion analysis method based on video compression code stream in the second embodiment of the present invention.

As a preferred implementation in the present invention, FIG. 2 is a flow chart of the motion analysis method based on video compression code stream. Specifically, the motion analysis method based on video compression code stream is shown in FIG. 2:

In step 201, a total number of bits or a residual bit number of a macro block in a video frame is extracted from video compression code stream.

Then the process proceeds to step 202. Classification of the macro block is merged into inter macro block and intra macro block according to the compression standard of the video compression code stream.

In other embodiments of the present invention, the process of merging inter-frame and intra macro blocks of the M frames is also called normalized processing for classification of the macro block of inter and\or intra macro blocks of the M frames.

Then the process proceeds to step 203. The total number of bits or the residual bit number of the macro block is remapped to the total number of bits or the residual bit number being independent with the quantization quantity according to the quantization algorithm defined by the compression standard of the video compression code stream.

Then the process proceeds to step 204. Weighted average is performed to the total number of bits or the residual bit number of the macro blocks whose positions correspond with the current macro block in latest M frames and then a background value is obtained through calculating, in which M is a natural number.

The weighted average to residual bit number of the macro blocks whose positions correspond with the current macro block in latest M frames can be performed by following method:

$$bg\_avg\_rsd(k) = \Sigma_{i=0}^{m-1} \omega(k-i) \times block\_rsd(k-i)$$

wherein, bg_avg_rsd(k) indicates that the residual bit number of the macro blocks whose positions correspond with the current macro block in latest M frames is the residual bit number having been weighted average, k indicates current moment in time domain, block_rsd (k−i) indicates residual bit number of macro blocks having the same position in former moment i of time-domain, m is a positive integer and indicates to perform weighted average to the residual bit number of the macro blocks whose positions correspond with M frames, ω(k−i) is the weight of the residual bit number of the macro blocks whose positions correspond with M frames and needs to meet the condition of $\Sigma_{i=0}^{m-1} \omega(k-i) = 1$ and ω(k−i) ≥0.

Weighted average background modeling is performed to macro block information, such as the total number of bits or the residual bit number of the macro block and the like, wherein the position of the macro block corresponds with the current macro block of the P frame or the B frame in the latest M frames. Threshold determination is performed to a background difference value matching result and motion analysis is performed. Coding picture of the inter macro block does not need to be calculated. Calculated quantity is small and the adaptability to the coding code stream and a scene is strong.

Then the process proceeds to step 205. Difference value between the total number of bits or the residual bit number of the current macro block and the background value is calculated.

When calculating the difference rsd_dif between the total number of bits or the residual bit number block_rsd of the current macro block and the background value bg_avg_rsd, the difference measure method between the residual bit number and the background value can utilize absolute difference rsd_dif=|block_rsd−bg_avg_rsd| between the residual bit number block_rsd and the background value bg_avg_rsd in current macro blocks of both number, but not restrict to the absolute value measure method, which can be such as the square root of the difference, etc.

Then the process proceeds to step 206. Whether the difference value between the total number of bits or the residual bit number of the current macro block and the background value is greater than predetermined first threshold is determined.

If the difference value between the total number of bits or the residual bit number of the current macro block and the background value is greater than the predetermined first threshold, the process proceed to step 207; otherwise this process ends.

In step 207, if the difference of the total number of bits or residual bit number is determined to be greater than the predetermined first threshold, a moving object is determined that has been detected in the current macro block. Then the process ends.

The third embodiment of the present invention relates to a motion analysis method based on video compression code stream.

The third embodiment is improved based on the first embodiment. The main improvement is: after calculating the difference value between the total number of bits or the residual bit number of the current macro block and the background value, the difference is implemented triple threshold determination to further improve accuracy rate of the motion analysis. The motion vector of the current macro block can be obtained by weighted average filtering the motion vectors of different type of macro blocks, which forms a unified expression of the motion vector to facilitate sequential motion analysis.

To be specific:

Before the step 103 that difference value between the total number of bits or the residual bit number of the current macro block and the background value is calculated, the method further includes a following step:

A motion vector of a macro block in a video frame is extracted from video compression code stream.

After the step 103 that difference value between the total number of bits or the residual bit number of the current macro block and the background value is calculated, the method includes a following step:

A moving object is determined that has been detected if the difference is greater than predetermined third threshold and motion vector of the current macro block is greater than predetermined second threshold, in which the predetermined first threshold is greater than or equal to the predetermined third threshold.

In other embodiments of the present invention, measure method of the motion vector can be absolute value of the vector, such as adopting absolute value and/or the square root of the sum of the squares of its horizontal and management components In other embodiments of the present invention, the thresholds can be predetermined or dynamically generated or dynamically adjusted according to scene's classification, sensitivity parameters inputted by users and noise intensity, in which usually the greater the noise intensity is, the bigger the threshold is and the greater the sensitivity parameter is, the smaller the threshold is.

Before the step that a motion vector of a macro block in a video frame is extracted from video compression code stream, the method also includes a following step:

Classification of the macro block is merged into inter macro block and\or intra macro block according to the compression standard of the video compression code stream.

The step that a motion vector of a macro block in a video frame is extracted from video compression code stream further includes following sub-steps:

weighted average is performed to motion vectors of all sub-macro blocks to obtain the motion vector of the current macro block when the current macro block is an inter macro block and has been divided to multiple sub-macro blocks;

weighted average is performed to motion vectors of inter macro blocks around the intra macro block to obtain the motion vector of the current macro block when the current macro block is an intra macro block.

Figure 3:
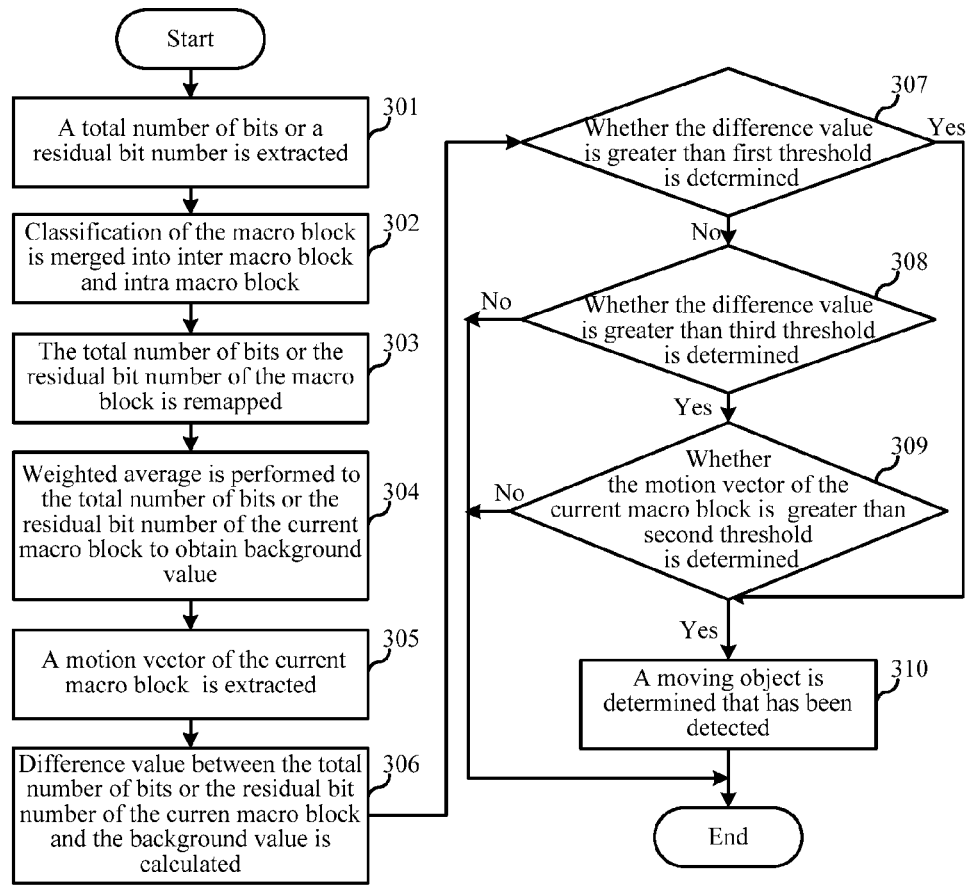
FIG. 3 shows a flow chart of a motion analysis method based on video compression code stream in the third embodiment of the present invention.

As a preferred implementation in the present invention, FIG. 3 is a flow chart of a motion analysis method based on video compression code stream. As shown in FIG. 3, the motion analysis method based on video compression code stream specifically includes following steps:

In step 301, a total number of bits or a residual bit number of a macro block in a video frame is extracted from video compression code stream.

Then the process proceeds to step 302. Classification of the macro block is merged into inter macro block and\or intra macro block according to the compression standard of the video compression code stream.

In other embodiments of the present invention, the process of merging inter-frame and intra macro blocks of the M frames is also called normalized processing on classification of the macro block of inter and\or intra macro blocks of the M frames.

Then the process proceeds to step 303. The total number of bits or the residual bit number of the macro block is remapped to the total number of bits or the residual number being independent with quantization parameter according to quantization algorithm defined by compression standard of the video compression code stream.

Then the process proceeds to step 304. Weighted average is performed to the total number of bits or the residual bit number of the macro blocks whose positions correspond with the current macro block in the latest M frames and a background value is obtained through calculating, in which M is a natural number.

The weighted average to residual bit number of the macro blocks whose positions correspond with the current macro block in the latest M frames can be performed by following method:

$$bg\_avg\_rsd(k) = \Sigma_{i=0}^{m-1} \omega(k-i) \times block\_rsd(k-i)$$

wherein, bg_avg_rsd(k) indicates that the residual bit number of the macro blocks whose positions correspond with the current macro block in the latest M frames is the residual bit number having been weighted average, k indicates current moment in time domain, block_rsd(k−i) indicates residual bit number of macro blocks having the same position in former moment i of time-domain, m is a positive integer and indicates to perform weighted average to the residual bit number of the macro blocks whose positions correspond with M frames, $\omega(k-i)$ is the weight of the residual bit number of the macro blocks whose positions correspond with M frames and needs to meet the condition of $\Sigma_{i=0}^{m-1} \omega(k-i) = 1$ and $\omega(k-i) \geq 0$.

Weighted average background modeling is performed to macro block information, such as the total number of bits or the residual bit number of the macro block and the like, wherein the position of the macro block corresponds with the current macro block of the P frame or the B frame in the latest M frames. Threshold determination is performed to a background difference value matching result and motion analysis is performed. Coding picture of the inter macro block does not need to be calculated. Calculated quantity is small and the adaptability to the coding code stream and a scene is strong.

Then the process proceeds to step 305. A motion vector of the macro block in the video frame is extracted from the video compression code stream.

Then the process proceeds to step 306. Difference value between the total number of bits or the residual bit number of the current macro block and the background value is calculated.

When calculating the difference rsd_dif between the total number of bits or the residual bit number block_rsd of the current macro block and the background value bg_avg_rsd, the difference measure method between the residual bit number and the background value can utilize absolute difference rsd_dif=|block_rsd−bg_avg_rsd| between the residual bit number block_rsd and the background value bg_avg_rsd in current macro blocks of both number, but not restrict to the absolute value measure method, which can be such as the square root of the difference, etc.

Then the process proceeds to step 307. Whether the difference value between the total number of bits or the residual bit number of the current macro block and the background value is greater than predetermined first threshold is determined.

If the difference value between the total number of bits or the residual bit number of the current macro block and the background value is not greater than the predetermined first threshold, the process proceeds to step 308; otherwise proceeds to step 310.

In step 308, whether the difference value between the total number of bits or the residual bit number of the current macro block and the background value is greater than predetermined third threshold is determined, wherein the first threshold is greater than or equal to the third threshold.

If the difference value between the total number of bits or the residual bit number of the current macro block and the background value is greater than the predetermined third threshold, the process proceeds to step 309; otherwise the process ends.

In step 309, if the difference value between the total number of bits or the residual bit number of the current macro block and the background value is greater than the predetermined third threshold, whether the motion vector extracted in step 305 is greater than predetermined second threshold is determined.

If the difference value between the total number of bits or the residual bit number of the current macro block and the background value is greater than the predetermined third threshold and the motion vector of the current macro block is greater than the predetermined second threshold, the process proceeds to step 310; otherwise the process ends.

In step 310, a moving object is determined that has been detected if the difference value between the total number of bits or the residual bit number of the current macro block and the background value is determined to be greater than the predetermined third threshold in step 308 and the motion vector of the current macro block is determined to be great than the predetermined second threshold in step 309, or the difference value between the total number of bits or the residual bit number of the current macro block and the background value is greater than the predetermined first threshold in which the predetermined first threshold is greater than or equal to the predetermined third threshold, and then the process ends.

In other embodiments of the present invention, step 301 and 305 can be parallel executed, that is, the total bit number or the residual bit number of a macro block in a video frame and the motion vector of the current macro block are extracted from the video compression code stream.

Figure 4:
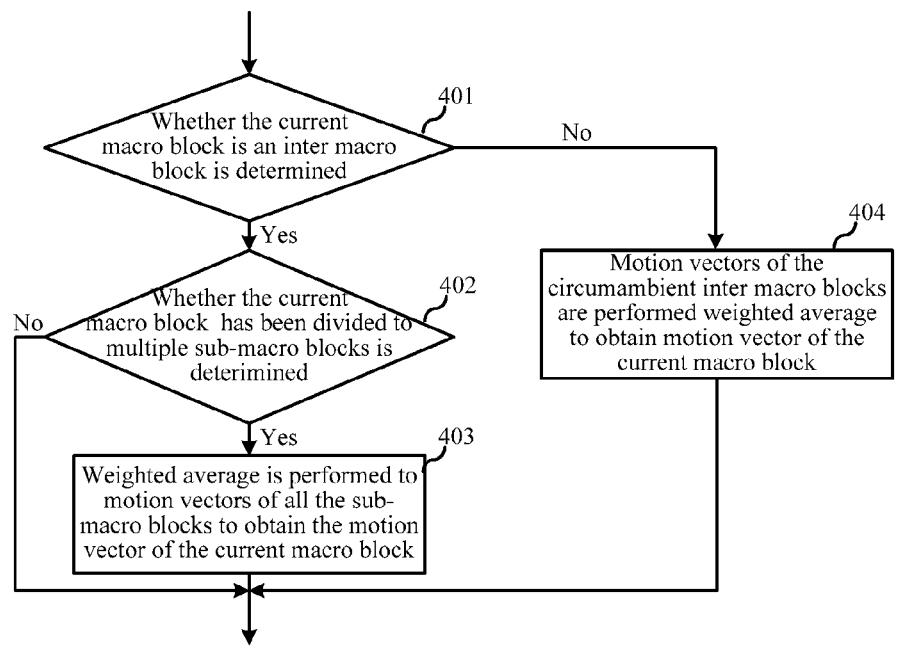
FIG. 4 shows a flow chart of a sub-step of the step 305 that extracting motion vector of the current macro block in the third embodiment of the present invention.

FIG. 4 is a flow chart of the motion analysis method based on video compression code stream. Specifically, as shown in FIG. 4, the step 305 of extracting motion vector of the current macro block further includes following sub-steps in the motion analysis method based on video compression code stream:

In step 401, whether the current macro block is an inter macro block is determined.

If the current macro block is an inter macro block, the process proceeds to step 402; otherwise, proceeds to step 404.

In step 402, if the current macro block is an inter macro block, whether the current macro block being an inter macro block has been divided to multiple sub-macro blocks is sequentially determined.

If the current macro block is an inter macro block and has been divided to multiple sub-macro blocks, the process proceeds to step 403; otherwise proceeds to above step 306.

In step 403, weighted average is performed to motion vectors of all the sub-macro blocks to obtain the motion vector of the current macro block when the current macro block is an inter macro block and has been divided to multiple sub-macro blocks and then the process proceeds to above step 306.

In other embodiments of the present invention, weighted average is performed to motion vectors of all sub-macro blocks of the current macro block being an inter macro block to obtain the motion vector of the current macro block, which can be maximum value, minimum value or medium value of all sub-macro block, etc. And the inter macro block reserves only one motion vector as the motion vector of the current macro block being an inter macro block. Similarly, for the current macro block being an intra macro block and having no motion vector, its motion vector can be obtained by performing weighted average to motion vectors of the inter macro blocks around it, or by using maximum value, minimum value or medium value of the motion vectors of all inter macro blocks, etc.

In step 404, as classification of the macro block has been merged to only contain type of inter and/or intra macro blocks in step 302, motion vectors of the inter macro blocks which is around the intra macro block are performed weighted average to obtain motion vector of the current macro block, when the current macro block has been determined as an intra macro block in above step 401. Then the process proceeds to step 306.

Figure 5:
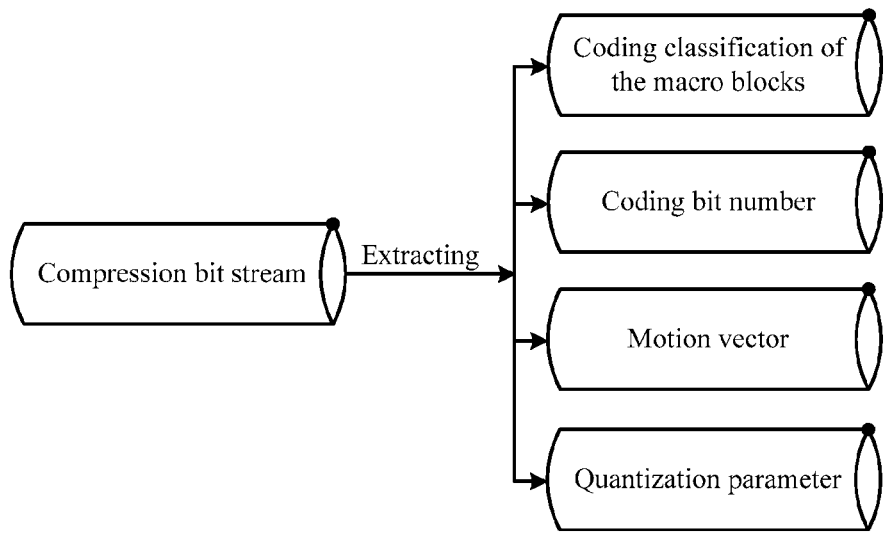
FIG. 5 shows a diagram of macro block information of a motion analysis method based on video compression code stream in the third embodiment of the present invention.
Figure 6:
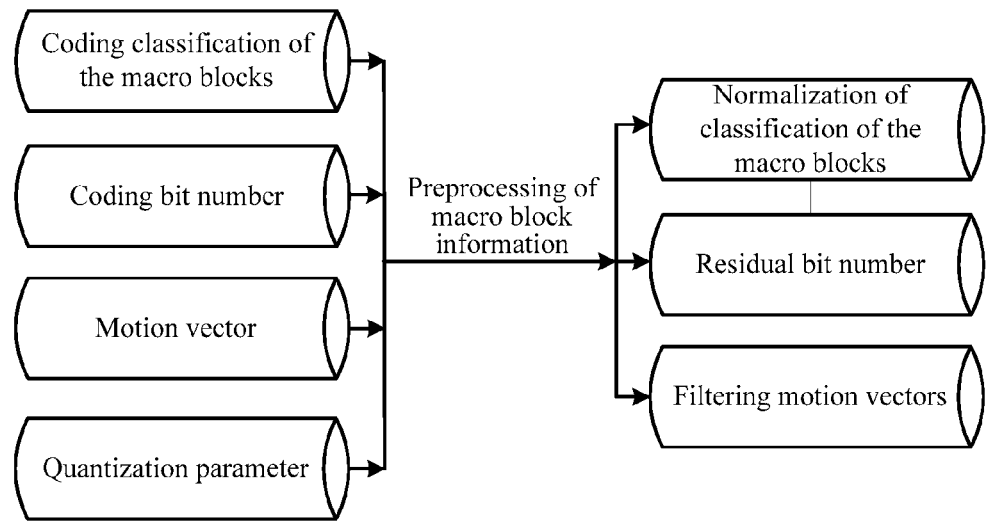
FIG. 6 shows a diagram of macro block information of a motion analysis method based on video compression code stream in the third embodiment of the present invention.

As a referred implementation in the present invention, its specific embodiment is described as following section:

Firstly, macro information of P frame or B frame is extracted from compression code stream according to above motion analysis method based on video compression code stream, as shown in FIG. 5. Then preprocessed macro block information is generated as shown in FIG. 6, wherein the preprocessing includes normalization of coding classification of the macro blocks in extracted frame, quantization parameter related remapping of the total number of bits or the residual bit number in extracted frame and filtering motion vectors. Several present mainstream video compression standards based on hybrid coding framework are different on the respects of definition of classification of the macro block, quantization and segmentation of motion vector, such as MPEG2, MPEG4, and H.264, etc. These different types of macro block information is filtered and remapped by the preprocessing to form a unified expression.

In step of merging classification of the macro block, two classifications which are intra macro block and inter macro block are subdivided to many sub-types by different types of compression standards. These sub-types are merged to one macro block classification mb_type which has two classification of intra macro block and inter macro block and the processed classification of the macro block is marked as block_type. Moreover, different classification of the macro block mb_type may change the remapping for the total number of bits mb_bits of extracted frame's macro block mentioned in section below.

In step that the total bit number mb_bits of the macro block of the extracted frame is remapped according to the quantization algorithm defined by compression standard, it results in the different total number of bits or the residual bit number mb_bits of the macro block of extracted frame because all kinds of compression standards have different quantitative curves and algorithms. Therefore, when the remapping is required, different measurement of the macro block of the extracted frame can be converted from quantization parameter related compression bits to the picture residual which is independent with the quantization parameter. Remapped residual bit number of the macro block is remarked as block_rsd. Method of the remapping is that the total number of bits mb_bits of the macro block of the extracted frame by a weighted value W which form a monotonic increasing curve with the quantization parameter. The curve is defined by quantization algorithm of each compression standard and influenced by the macro block classification mb_type, for example, intra macro block and inter macro block have different remapping curves.

When inter macro block is divided to many sub-macro blocks, motion vector MV is filtered and the filtering method for filtering motion vectors MV can be performing weighted average to various sub-macro blocks or using of maximum value, minimum value or medium value of the motion vectors of all sub-macro blocks, etc. In conclusion, one inter macro block only preserve one motion vector MV as its motion vector. It should notice that there is no information about motion vector in coding code stream when a macro block is an intra macro block, in this case, motion vector of the intra macro block can utilize the weighted average of the motion vectors of the macro blocks around this intra macro block. The motion vector of the filtered macro block is marked as block_mv.

Figure 7:
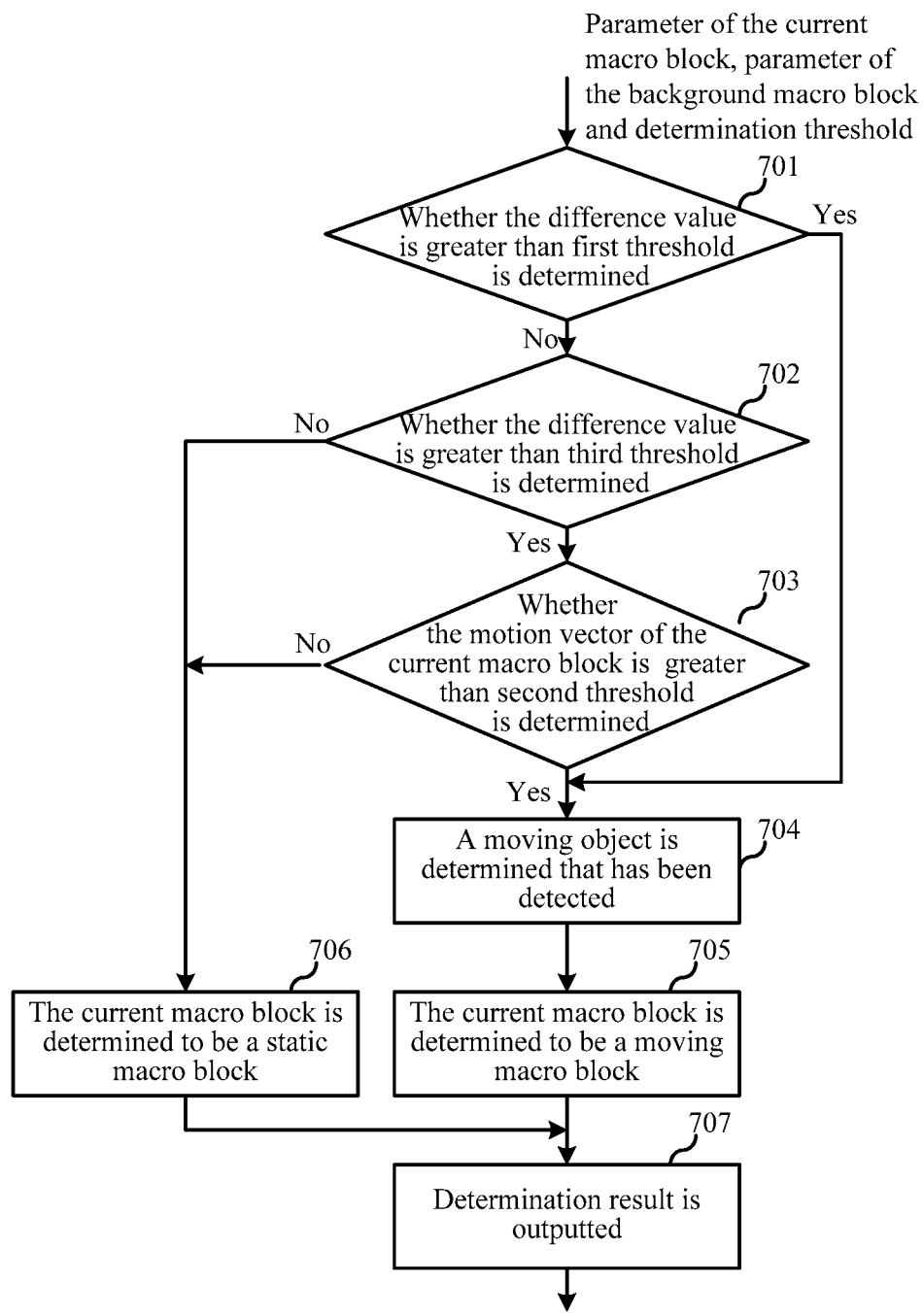
FIG. 7 shows a flow chart of a motion analysis method based on video compression code stream in the third embodiment of the present invention.

As a preferred implementation in the present invention, FIG. 7 is a flow chart of the motion analysis method based on video compression code stream. As shown in FIG. 7, the motion analysis method based on video compression code stream specifically includes following steps:

In step 701, whether the difference value between the total number of bits or the residual bit number of the current macro block and the background value is greater than the predetermined first threshold is determined.

If the difference value between the total number of bits or the residual bit number of the current macro block and the background value is greater than the predetermined first threshold, the process proceeds to step 704; otherwise proceeds to step 702.

In step 702, if the difference value between the total bit number or residual bit number of the current macro block and the background value is not greater than the predetermined first threshold, whether the difference value between the total bit number or the residual bit number of the current macro block and the background value is greater than predetermined third threshold is sequentially determined, in which the first threshold is greater than or equal to the third threshold.

If the difference value between the total number of bits or the residual bit number of the current macro block and the background value is greater than predetermined third threshold, the process proceeds to step 703; otherwise proceeds to step 706.

In step 703, if the difference value between the total number of bits or the residual bit number of the current macro block and the background value is not greater than predetermined first threshold but greater than the third threshold, whether the motion vector of the current macro block is great than predetermined second threshold is sequentially determined.

If the motion vector of the current macro block is great than the predetermined second threshold, the process proceeds to step 704; otherwise proceeds to step 706.

In step 704, if the difference value between the total number of bits or the residual bit number and of the current macro block the background value is not greater than predetermined first threshold but greater than the third threshold and the motion vector of the current macro block is great than the predetermined second threshold, the current macro block is determined to be the macro block in which moving objects have been detected.

Then the process proceeds to step 705, the macro block in which the moving object has been detected is determined to be a moving block, and then the process proceeds to step 707.

In step 706, if the difference value between the total number of bits or the residual bit number of the current macro block and the background value is not greater than predetermined first threshold and the third threshold and/or the motion vector of the current macro block is not great than the predetermined second threshold, the current macro block is determined to be a static macro block.

Then the process proceeds to step 707, determination result of the static macro block and the moving macro block is outputted or the static macro block or the moving macro block is outputted.

The fourth embodiment of the present invention relates to a motion analysis method based on video compression code stream.

The fourth embodiment is improved based on the first embodiment. The main improvement is: macro block determination of designated area and/or direction is added to the motion analysis method based on video compression code stream, which the macro block of designated area and/or direction can be automatically and quickly located. The background value of the macro block will not be calculated subsequently if it is not macro block of the designated area and/or direction, which will save unnecessary system overhead as well as time and energy in practical application, such as the video compression motion analysis, etc.

Motion area and direction in the picture can be detected by normalized processing and background modeling for macro block information only in P frame and B frame and detecting moving objects using the background model. This method has a small calculated quantity and can easily and effectively eliminate the influence of noise and light in various scenes to deal with all kinds of complicated indoor and outdoor scenes. It also can quickly get designated motion area and direction. Moreover, by only rebuilding picture of I frame instead of P frame or B frame, it can omit some procedures having no serious influence on quality of the I picture to save calculated quantity, such as loop filtering.

Specifically:

before the step 102 that a background value is obtained through calculating, the method includes following steps:

whether the current macro block is the macro block in designated area is determined and then if the current macro block is the macro block in designated area, the step that a background value is obtained through calculating is executed, otherwise detection for the current macro block ends.

In the other embodiments of the present invention, the motion analysis of the motion analysis method base on video compression code stream is not limited to only on designated area of video frame in video compression code stream. The motion analysis detection for one or more picture frames of video frame can be implemented by the motion analysis method based on video compression code stream, or the video frame is defaulted to be an area of the full picture, when the requirement for continuity of moving object is higher.

Before the step 102 that a background value is obtained through calculating, the method includes following steps:

whether the angle between direction of the motion vector of current macro block and the designated direction is smaller than a predetermined threshold is determined and then the step that a background value is obtained through calculating is executed if the angle is smaller than the predetermined threshold, otherwise detection for the current macro block ends.

In other embodiments of the present invention, it is not limited to implement motion analysis only on designated motion direction of the video frame in video compression code stream, which can be defaulted as any directions.

The method of determining whether a motion direction interested users can be calculating an angle of two directions, which determines that the two directions are identical if the angle is smaller than a specific threshold, otherwise determines that the two directions are not identical.

Before the step 101 that a total number of bits or a residual bit number of a macro block in a video frame is extracted from video compression code stream, the method includes following steps:

classification of the current frame is determined;

if the current frame is a B frame or a P frame, then the step that a total number of bits or a residual bit number of a macro block of a video frame is extracted from video compression code stream is executed;

if the current frame is an I frame, the picture of I frame is reconstructed and then the motion analysis is implemented according to the reconstructed picture of I frame.

Figure 8:
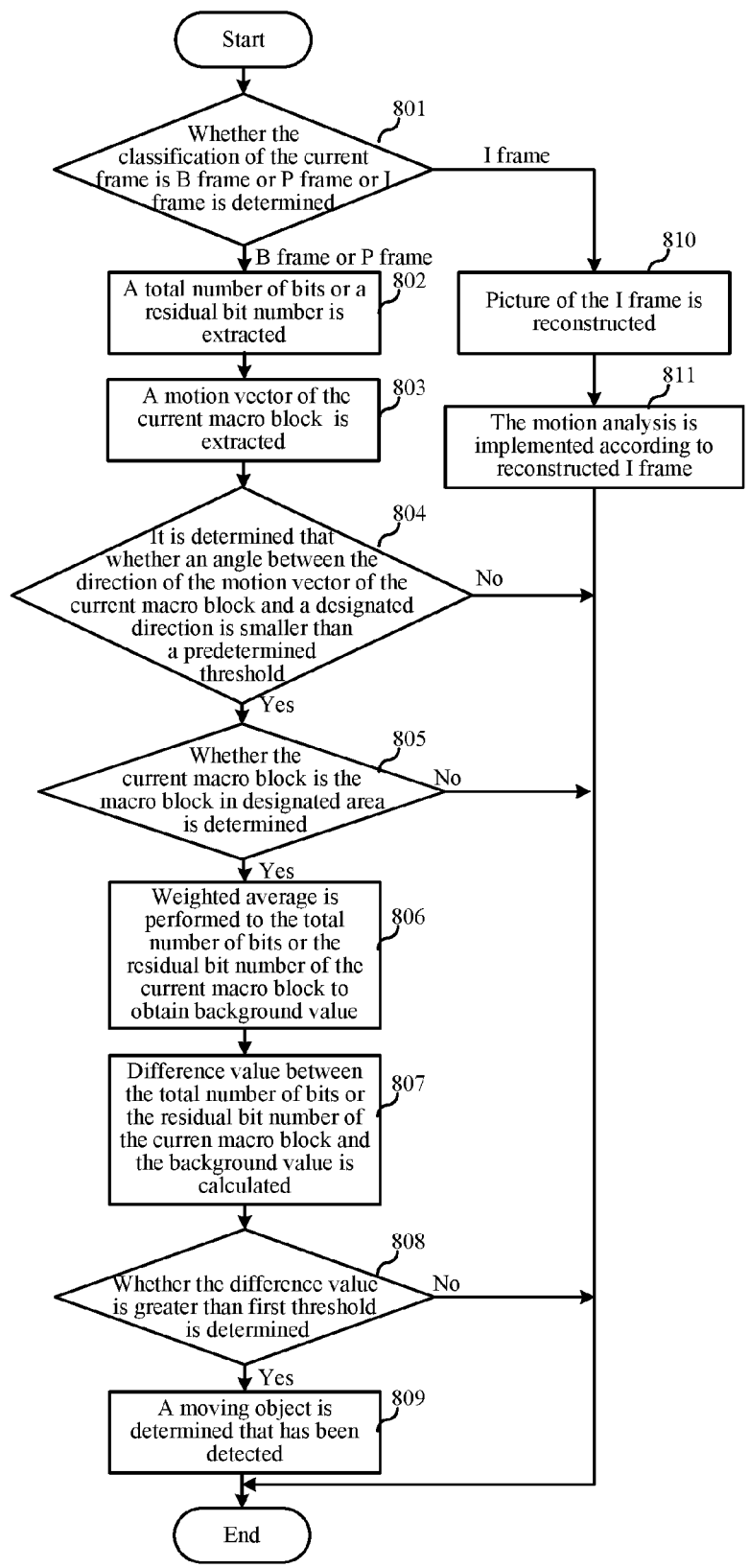
FIG. 8 shows a flow chart of a motion analysis method based on video compression code stream in the fourth embodiment of the present invention.

As a preferred implementation in the present invention, FIG. 8 is a flow chart of the motion analysis method based on the video compression code stream. As shown in FIG. 8, the motion analysis method based on video compression code stream specifically includes following steps:

In step 801, whether the classification of the current frame is B frame or P frame or I frame is determined.

If it is I frame, the process proceeds to step 810; if it is P frame or B frame, the process proceeds to step 802.

In step 802, a total number of bits or a residual bit number of macro blocks in current P frame or current B frame is extracted.

Then the process proceeds to step 803, the motion vector of the macro block in the video frame is extracted from the video compression code stream.

Then the process proceeds to step 804, it is determined that whether an angle between the direction of the motion vector of the current macro block in current B frame or P frame and a designated direction is smaller than a predetermined threshold.

If the angle between the direction of the motion vector of the current macro block in current B frame or P frame and a designated direction is smaller than the predetermined threshold, the process proceeds to step 805; otherwise the process ends.

In step 805, whether the current macro block in current B frame or current P frame is the macro block in designated area is determined.

If the current macro block in current B frame or current P frame is the macro block in designated area, the process proceeds to step 806; otherwise the process ends.

In step 806, weighted average is performed to the total number of bits or the residual bit number of the current macro block in current B frame or P frame and a background value is obtained through calculating.

Then the process proceeds to step 807, a difference value between the total number of bits or the residual bit number of the current macro block in current B frame or current P frame and the background value is calculated.

Then the process proceeds to step 808, whether the difference is greater than first threshold is determined.

If the difference is greater than the first threshold, the process proceeds to step 809; otherwise the process end.

In step 809, it is determined that the current macro block is the macro block in which moving object has been detected and then end this process.

In step 810, picture of the I frame determined in step 801 is reconstructed.

Then the process proceeds to step 811. The motion analysis is implemented according to above reconstructed I frame and then the process ends.

Figure 9:
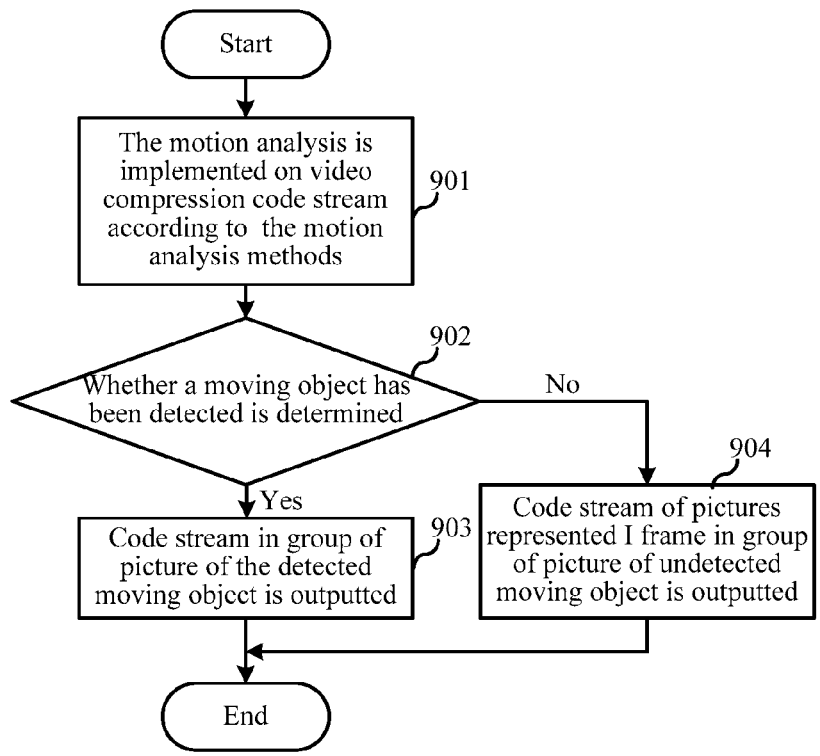
FIG. 9 shows a flow chart of a code stream conversion method based on video compression code stream in the fifth embodiment of the present invention.

The fifth embodiment of the present invention relates to a code stream conversion method based on video compression code stream. FIG. 9 is a flow chart of the code stream conversion method based on video compression code stream. As shown in FIG. 9, the code stream conversion method based on video compression code stream specifically includes following steps:

In step 901, the motion analysis is implemented on video compression code stream according to any one of the motion analysis methods mentioned above.

Code stream can be converted by directly using the result of the motion analysis without cost a great deal of calculated quantity, which can keep information of original picture and reduce pressure of storage and network bandwidth caused by incremental code stream.

In other embodiments of the present invention, the motion analysis method based on video compression code stream can be chosen to implement motion analysis for macro block of I frame to determine relatively slower movement. However, the motion analysis for macro block of I frame would not be chosen to implemented.

Then the process proceeds to step 902. Whether a moving object has been detected is determined according to the analysis result from the step 901 that the motion analysis is implemented on the video compression code stream according to any one of the motion analysis methods mentioned above.

If the motion analysis determination is that the moving object has been detected, the process proceeds to step 903; otherwise the process proceeds to step 904.

In step 903, if the motion analysis has determined that a moving object has been detected, code stream in group of picture of the detected moving object is outputted and then the process ends.

In step 904, if the motion analysis has determined that moving object has not been determined, only code stream of pictures represented I frame in group of picture of undetected moving object is outputted and then the process ends.

In some other embodiments of the present invention, code stream represented the picture of I frame can be original code in GOP or transcoding code stream of the picture of the reconstructed I frame.

As a preferable implementation in the present invention, code stream conversion of the code stream conversion method based on video compression code stream can be implemented in GOP.

Figure 10:
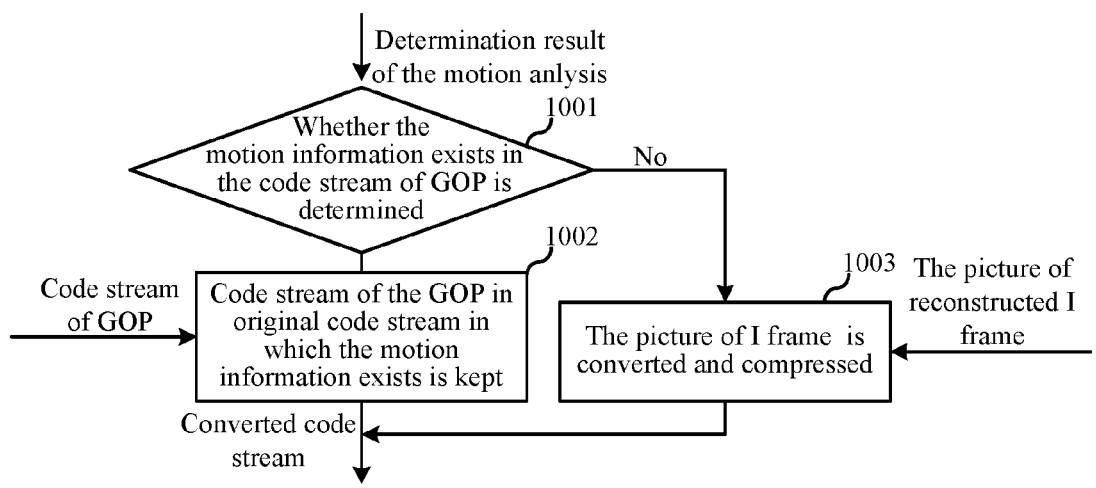
FIG. 10 shows a flow chart of a code stream conversion method based on video compression code stream in the fifth embodiment of the present invention.

As a preferred implementation in the present invention, FIG. 10 is a flow chart of the code stream conversion method based on video compression code stream. As shown in FIG. 10, the code stream conversion method based on video compression code stream specifically includes following steps:

In step 1001, whether the motion information exists in the code stream of GOP is determined according to the determination result of the motion analysis on video compression code stream of any one of above motion analysis methods.

If the motion information exists in the code stream of GOP, the process proceeds to step 1002; otherwise the process proceeds to step 1003.

In step 1002, if the motion information exists in the code stream of GOP, code stream of the GOP in original code stream in which the motion information exists is kept as the outputting for code stream conversion.

In step 1003, if the motion information does not exist in the code stream of GOP, the picture of reconstructed I frame in which the motion information does not exist is converted and compressed as the outputting for code stream conversion.

Figure 11:
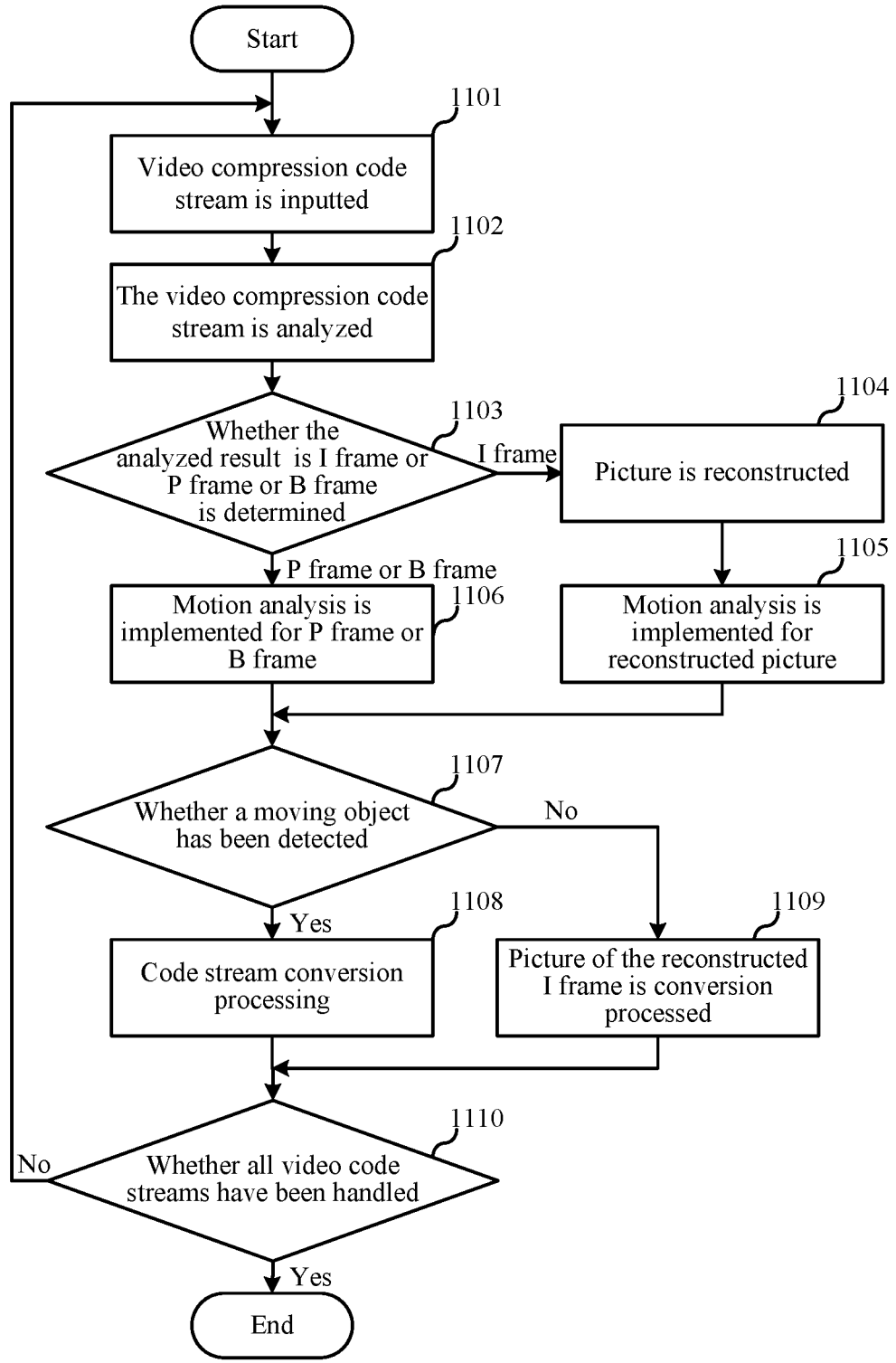
FIG. 11 shows a flow chart of a code stream conversion method based on video compression code stream in the fifth embodiment of the present invention.

As a preferred implementation in the present invention, FIG. 11 is a flow chart of the code stream conversion method based on video compression code stream. As shown in FIG. 11, the code stream conversion method based on video compression code stream specifically includes following steps:

In step 1101, video compression code stream is inputted.

Then the process proceeds to step 1102. The video compression code stream is analyzed.

Then the process proceeds to step 1103. Whether the analyzed result of the video compression code stream is I frame or P frame or B frame is determined.

If it is I frame, the process proceeds to step 1104; if it is P frame or B frame, the process proceeds to step 1106.

In step 1104, picture of the I frame is reconstructed.

Then the process proceeds to step 1105. Motion analysis is implemented for reconstructed I frame and then the process proceeds to step 1107.

In step 1106, motion analysis is implemented for P frame or B frame.

Then the process proceeds to step 1107. Whether a moving object has been detected is determined according to above motion analysis result for the picture of P frame or B frame and reconstructed I frame.

If the moving object has been detected, the process proceeds to step 1108; otherwise the process proceeds to step 1109.

In step 1108, video compression code stream in which moving object exists is code stream conversion processed and then the process proceeds to step 1110.

In step 1109, picture of the reconstructed I frame in which moving objet never exists is code stream conversion processed and then the process proceeds to step 1110.

In step 1110, whether all video code streams have been handled is determined.

If all video code streams have not been processed, return to step 1101 to continue inputting video compression code stream; otherwise, the process ends.

The method embodiments of this invention all can be implemented by software, hardware and firmware etc. No matter this invention is implemented by software, or hardware, or firmware, instruction codes all can be stored in the memory (such as permanent or revisable, volatile or non-volatile, solid or non solid, fixed or exchangeable media etc) that any type of computers can access. Likewise, the memory can be such as programmable array logic, random access memory, programmable read only memory, read-only memory, electrically erasable programmable ROM, floppy disc, optical disc, and digital versatile disc etc.

Figure 12:
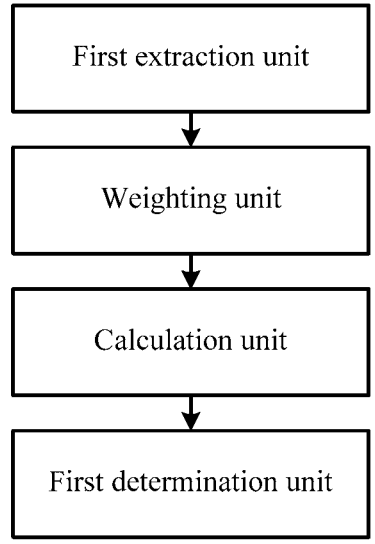
FIG. 12 shows a structure diagram of a motion analysis apparatus based on video compression code stream in the sixth embodiment of the present invention.

The sixth embodiment of the present invention relates to a motion analysis apparatus based on video compression code stream. FIG. 12 is a structure diagram of the motion analysis apparatus based on video compression code stream. As shown in FIG. 12, the motion analysis apparatus based on video compression code stream specifically includes following units:

A first extraction unit is configured to extract a total number of bits or a residual bit number of a macro block in a video frame from video compression code stream.

A weighting unit is configured to perform weighted average to the total number of bits or the residual bit number of macro blocks whose positions correspond with current macro block in latest M frames and to obtain a background value through calculating, in which M is a natural number;

A calculation unit is configured to calculate difference value between the total number of bits or the residual bit number of the current macro block and the background value obtained from the weighting average unit through calculating.

A first determination unit is configured to determine whether the difference value calculated by the calculation unit is greater than predetermined first threshold, and then determine that a moving object has been detected if the difference value is greater than the predetermined first threshold.

The first embodiment is the method embodiment corresponding to this embodiment, and this embodiment and the first embodiment can be implemented in cooperation with each other. Correlated technical details disclosed in the first embodiment are still effective in this embodiment and will not be repeated here in order to reduce duplication. Correspondingly, correlated technical details disclosed in this embodiment can also be applied in the first embodiment.

Figure 13:
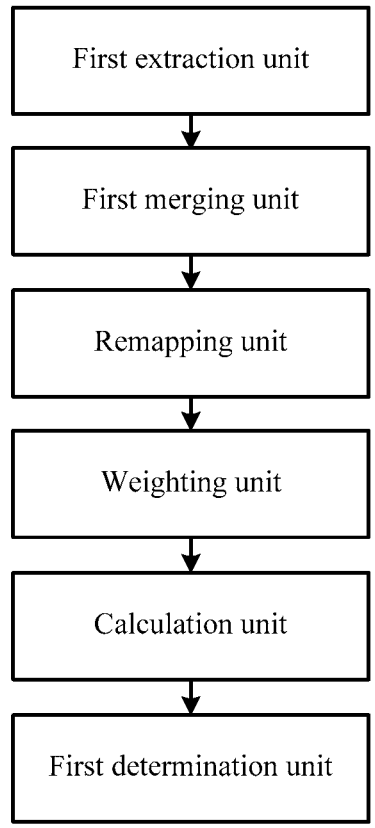
FIG. 13 shows a structure diagram of a motion analysis apparatus based on video compression code stream in the seventh embodiment of the present invention.

The seventh embodiment of the present invention relates to a motion analysis apparatus based on video compression code stream. FIG. 13 is the structure diagram of the motion analysis apparatus based on video compression code stream.

The seventh embodiment is improved based on the sixth embodiment. The main improvement is: a remapping unit is added to the apparatus to quantify residual information in process of compressing video code stream, which can filter part of insensitive information for human eyes and reduce date quantity to improve compression effect when picture distortion has no obvious influence on the motion analysis result. A first merging unit is added to the apparatus to merge classification of the macro block into a normalized processing on intra and inter macro blocks and a preprocessing procedure of macro block information in remapping processing, which enables the macro block information can be expressed in a unified form to facilitate sequential motion analysis.

As shown in FIG. 13, the motion analysis apparatus based on video compression code stream specifically further includes following units:

A remapping unit is configured to remap the total number of bits or the residual bit number of the macro block extracted in the first extraction unit to the total number of bits or the residual bit number being independent with quantization parameter according to quantization algorithm defined by compression standard of the video compression code stream.

A first merging unit is configured to merge classification of the macro block into inter macro block and intra macro block according to the compression standard of video compression code stream. After the classification of the macro block is merged into inter macro block and intra macro block according to the compression standard of video compression code stream by the first merging unit, the remapping is performed according to quantization algorithm and merged classification of the macro block by the remapping unit.

The remapping unit is further configured to remap the total number of bits or the residual bit number of the macro block to the total number of bits or the residual bit number being independent with the quantization quantity according to the quantization algorithm defined by the compression standard of the video compression code stream and the classification of the macro block merged by the first merging unit.

In the sixth specific embodiment, the weighted average of the weighting unit to the residual bit number of the macro blocks whose positions correspond with the current macro block in latest M frames can be performed by following method:

$$\text{bg\_avg\_rsd}(k) = \Sigma_{i=0}^{m-1} \omega(k-i) \times \text{block\_rsd}(k-i)$$

wherein, bg_avg_rsd(k) indicates that the residual bit number of the macro blocks whose positions correspond with the current macro block in latest M frames is the residual bit number having been weighted average, k indicates current moment in time domain, block_rsd(k−i) indicates residual bit number of macro blocks having the same position in former moment i of time-domain, m is a positive integer and indicates to perform weighted average to the residual bit number of the macro blocks whose positions correspond with M frames, $\omega(k-i)$ is the weight of the residual bit number of the macro blocks whose positions correspond with M frames and needs to meet the condition of $\Sigma_{i=0}^{m-1} \omega(k-i) = 1$ and $\omega(k-i) \geq 0$.

The second embodiment is the method embodiment corresponding to this embodiment, and this embodiment and the second embodiment can be implemented in cooperation with each other. Correlated technical details disclosed in the second embodiment are still effective in this embodiment and will not be repeated here in order to reduce duplication. Correspondingly, correlated technical details disclosed in this embodiment can also be applied in the second embodiment.

Figure 14:
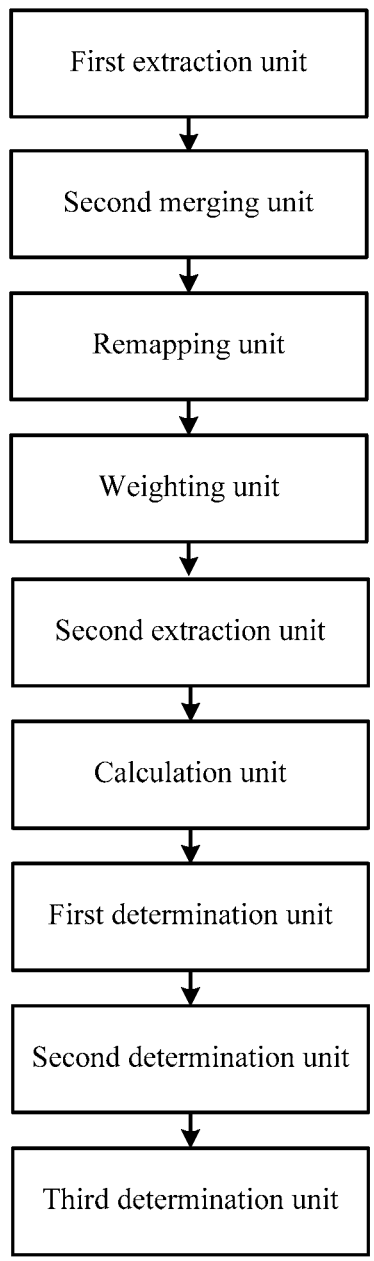
FIG. 14 shows a structure diagram of a motion analysis apparatus based on video compression code stream in the eighth embodiment of the present invention.

The eighth embodiment of the present invention relates to a motion analysis apparatus based on video compression code stream. FIG. 14 is the structure diagram of a motion analysis apparatus based on video compression code stream.

The eighth embodiment is improved based on the sixth embodiment. The main improvement is: after the difference value is calculated by the calculation unit, a triple threshold determination unit is added to the apparatus to implement triple threshold determination on the different value, which can further improve accuracy rate of the motion analysis. A second merging unit is added to the apparatus to merge classification of the macro block into a normalized processing on intra macro block and inter macro block and a preprocessing procedure of macro block information in remapping processing of the remapping unit, which enables the macro block information can be expressed in a unified form to facilitate sequential motion analysis. As shown in FIG. 14, the motion analysis apparatus based on video compression code stream specifically further includes following units:

A second extraction unit is configured to extract a motion vector of a macro block in a video frame from video compression code stream.

A second determination unit is configured to determine whether the motion vector of the current macro block extracted by the second extraction unit is greater than predetermined second threshold.

A third determination unit is configured to determine whether the obtained difference value which is calculated by the calculation unit is greater than predetermined third threshold when the motion vector of the current macro block is determined to be greater than the predetermined second threshold by the second determination unit, and then determine that a moving object has been detected if the difference is greater than the predetermined third threshold, in which the predetermined first threshold is greater than or equal to the predetermined third threshold.

A second merging unit is configured to merge classification of the macro block into inter macro block and intra macro block according to the compression standard of the video compression code stream before the motion vector of the macro block in the video frame is extracted from the video compression code stream by the second extraction unit.

Figure 15:
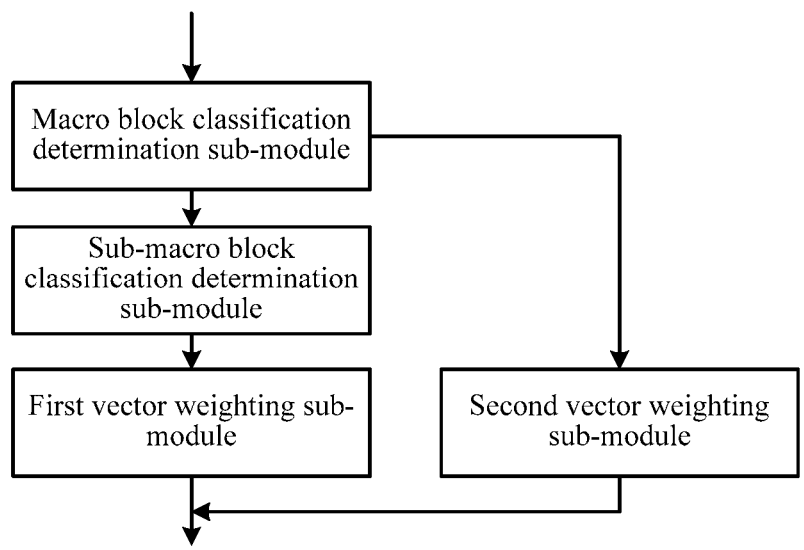
FIG. 15 shows a structure diagram of a motion analysis apparatus based on video compression code stream in the eighth embodiment of the present invention.

Wherein, as shown in FIG. 15, the second extraction unit in the motion analysis apparatus base on video compression code stream includes following sub-modules:

A macro block classification determination sub-module is configured to determine that the current macro block is an inter macro block or an intra macro block merged by the first or second merging unit.

A sub-macro block classification determination sub-module is configured to determine whether the inter macro block is divided to multiple sub-macro blocks when the current macro block is determined to be an inter macro block by the macro block classification determination sub-module.

A first vector weighting sub-module is configured to perform weighted average to motion vectors of all sub-macro blocks to obtain the motion vector of the current macro block when the current macro block is determined to be an inter macro block by the macro block classification determination sub-module and the current macro block is determined that has been divided to multiple sub-macro blocks by the sub-macro block determination sub-module.

A second vector weighting sub-module is configured to perform weighted average to motion vectors of inter macro blocks around the intra macro block to obtain the motion vector of the current macro block when the current macro block is determined to be an intra macro block by the macro block classification determination sub-module.

In other embodiments of the present invention, weighted average is performed to motion vectors of all sub-macro blocks of the current macro block being an inter macro block to obtain the motion vector of the current macro block, which can be maximum value, minimum value or medium value of all sub-macro block, etc. And the inter macro block reserves only one motion vector as the motion vector of the current macro block being an inter macro block. Similarly, for the current macro block being an inter macro block and having no motion vector, its motion vector can be obtained by performing weighted average to motion vectors of the inter macro blocks around it, or by using all maximum value, minimum value or medium value of the motion vectors of all inter macro blocks, etc.

The third embodiment is the method embodiment corresponding to this embodiment, and this embodiment and the third embodiment can be implemented in cooperation with each other. Correlated technical details disclosed in the third embodiment are still effective in this embodiment and will not be repeated here in order to reduce duplication. Correspondingly, correlated technical details disclosed in this embodiment can also be applied in the third embodiment.

Figure 16:
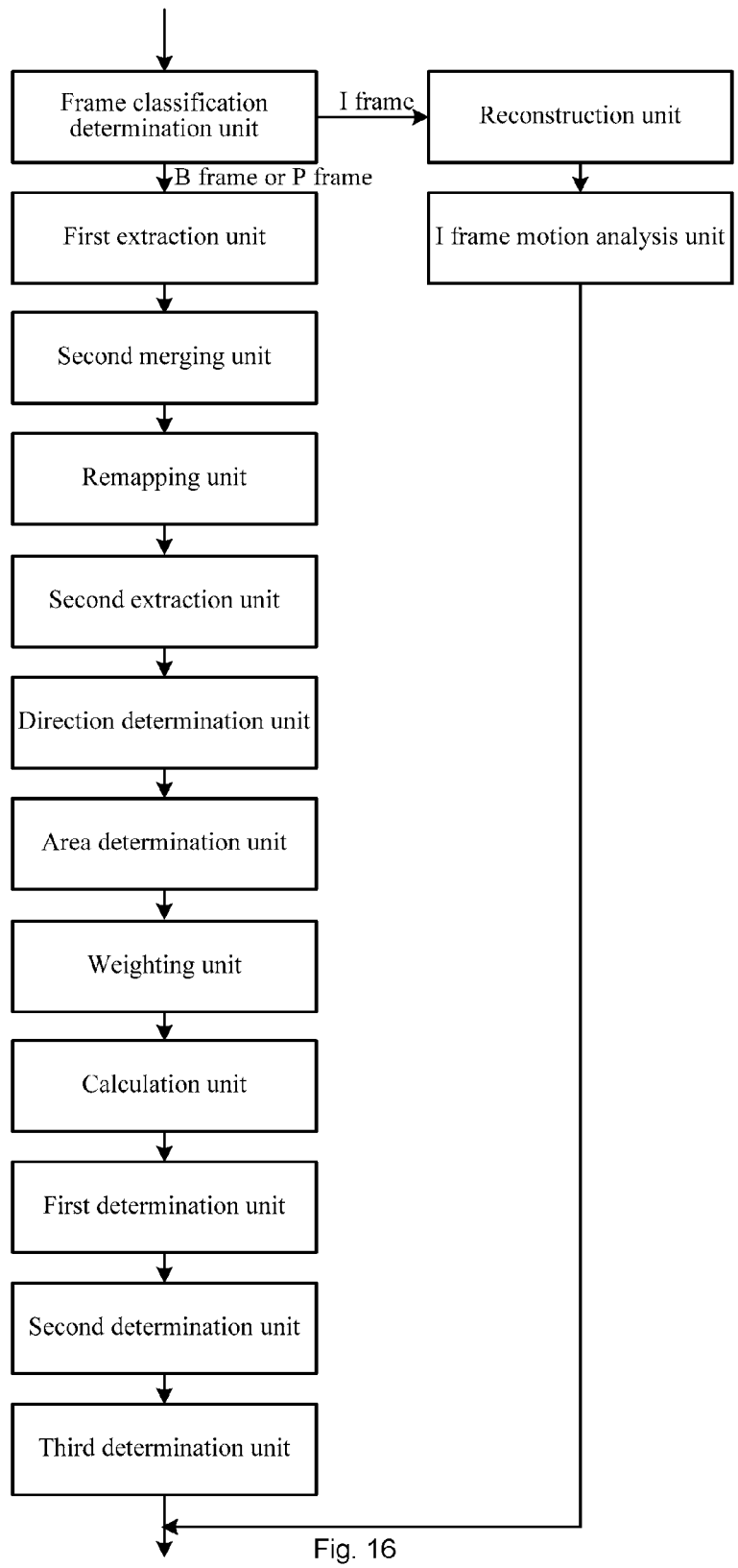
FIG. 16 shows a structure diagram of a code stream conversion apparatus based on video compression code stream in the ninth embodiment of the present invention.

The ninth embodiment of the present invention relates to a motion analysis apparatus based on video compression code stream. FIG. 16 is a structure diagram of the motion analysis apparatus based on video compression code stream.

The ninth embodiment is improved based on the sixth embodiment. The main improvement is: an area determination unit is added into the motion analysis method based on video compression code stream to implement macro block determination of designated area, which the macro block of designated area can be automatically and quickly located, and the background value of the macro block will not be calculated subsequently if the macro block is not the macro block of designated area, such that unnecessary system overhead is saved. A direction determination unit is added into the motion analysis method based on video compression code stream to implement motion vector determination of designated direction, which the macro block of designated direction can be automatically and quickly located, and the background value of the macro block will not be calculated subsequently if it is not the macro block of the designated direction, such that unnecessary system overhead as well as time and energy are saved in practical application, such as the video compression motion analysis, etc. Motion area and direction in the picture can be detected by normalized processing and background modeling for macro block information only in P frame and B frame and detecting moving objects using the background model. This method has a small calculated quantity and can easily and effectively eliminate the influence of noise and light in various scenes to deal with all kinds of complicated indoor and outdoor scenes. It also can quickly get designated motion area and direction. Moreover, by only rebuilding picture of I frame instead of P frame or B frame, it can omit some procedures having no serious influence on quality of the I picture to save calculated quantity, such as loop filtering.

As shown in FIG. 16, the motion analysis apparatus based on video compression code stream specifically further includes following units:

An area determination unit is configured to determine whether the current macro block is the macro block in designated area before the background value is obtained through calculating by the weighting unit, and if the current macro block is the macro block in designated area, then the step that background value is obtained through calculating by the weighting unit is executed, otherwise detection for the current macro block ends.

In the other embodiments of the present invention, the motion analysis of the motion analysis method base on video compression code stream is not limited to only on designated area of video frame in video compression code stream. The motion analysis detection for one or more picture frames of video frame can be implemented by the motion analysis method based on video compression code stream, or the video frame is defaulted to be an area of the full picture, when the requirement for continuity of moving object is higher.

A direction determination unit is configured to determine whether the angle between direction of the motion vector of current macro block and the designated direction is smaller than a predetermined threshold before the background value is obtained through calculating by the weighting unit, and if the angle is smaller than the predetermined threshold, the step that background value is obtained through calculating by the weighting unit is executed, otherwise detection for the current macro block ends.

The method of determining whether a motion direction interested users can be calculating an angle of two directions, which determines that the two directions are identical if the angle is smaller than a specific threshold, otherwise determine that the two directions are not identical.

In other embodiments of the present invention, it is not limited to implement motion analysis only on designated motion direction of video frame in video compression code stream, which can be defaulted as any directions.

The apparatus further includes following units:

A frame classification determination unit is configured to determine classification of the current frame and if the current frame is determined to be a B frame or P frame by the frame classification determination unit, then the step that a total number of bits or a residual bit number of a macro block in a video frame from video compression code stream is executed by the first extraction unit.

A reconstruction unit is configured to reconstruct the picture of I frame if the current macro frame is determined to be an I frame by the frame classification determination unit.

An I frame motion analysis unit is configured to implement motion analysis for the picture of the I frame reconstructed by the reconstruction unit.

In other embodiments of the present invention, the motion analysis method based on video compression code stream can be chosen to implement motion analysis for macro block of I frame to determine relatively slower movement. However, the motion analysis for macro block of I frame would not be chosen to implemented.

The fourth embodiment is the method embodiment corresponding to this embodiment, and this embodiment and the fourth embodiment can be implemented in cooperation with each other. Correlated technical details disclosed in the fourth embodiment are still effective in this embodiment and will not be repeated here in order to reduce duplication. Correspondingly, correlated technical details disclosed in this embodiment can also be applied in the fourth embodiment.

Figure 17:
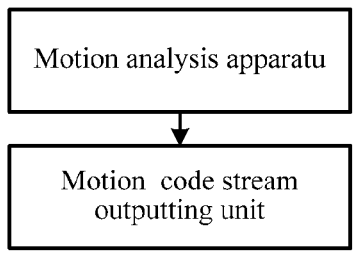
FIG. 17 shows a structure diagram of a code stream conversion apparatus based on video compression code stream in the tenth embodiment of the present invention.

The tenth embodiment of the present invention relates to a code stream conversion apparatus based on video compression code stream. FIG. 17 is a structure diagram of the code stream conversion apparatus based on video compression code stream. As shown in FIG. 17, the code stream conversion apparatus based on video compression code stream includes following components:

A motion analysis apparatus is configured to implement motion analysis on the video compression code stream according to any one of the motion analysis methods mention above.

A motion code stream outputting unit is configured to output code stream in group of picture of the detected moving object if the motion analysis of the motion analysis apparatus has determined that a moving object has been detected, otherwise output code stream of pictures represented I frame in group of picture of undetected moving object.

As a preferable implementation in the present invention, code stream conversion of the code stream conversion method based on video compression code stream can be implemented in GOP.

Moreover, code stream can be converted by directly using the result of the motion analysis without cost a great deal of calculated quantity, which can keep information of original pictures and reduce pressure of network bandwidth and storage caused by incremental code stream.

Code stream represented the picture of I frame can be original code in GOP or transcoding code stream of the picture of the reconstructed I frame.

Figure 18:
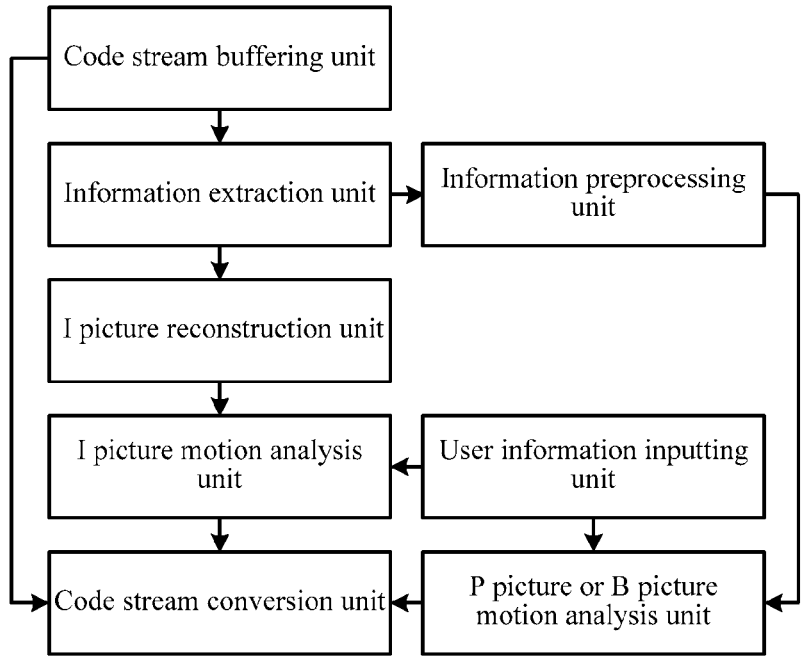
FIG. 18 shows a structure diagram of a code stream conversion apparatus based on video compression code stream in the tenth embodiment of the present invention.

As a preferable implementation in the present invention, FIG. 18 is a structure diagram of a code stream conversion apparatus based on video compression code stream in the tenth embodiment of the present invention. As shown in FIG. 18, the code stream conversion apparatus specifically includes following units:

A code stream buffering unit is configured to receive and/or store code stream of one GOP and send code streams corresponding to all pictures in GOP to an information extraction unit and a code stream conversion unit, respectively.

An information extraction unit is configured to analyze code stream according to the rule of the video compression standard which has no restriction and includes present mainstream MPEG2, MPEG4 and H.264, etc. In the process of analyzing code stream, information corresponding to every macro block is extracted for subsequent motion analysis.

An information processing unit is configured to preprocess macro block information of the picture of P frame or B frame extracted by the information extraction unit, wherein the preprocessing includes normalization of classification of the macro block, remapping for the total number of bits or the residual bit number of the macro block and filtering motion vectors. Several present mainstream video compression standards based on hybrid coding framework are different on the segmentation definition of classification of the macro block, quantization and segmentation of motion vector, such as MPEG2, MPEG4, and H.264, etc. These differences are filtered and remapped to form a unified expression by the information processing unit. Its specific method is:

Definition of the macro block is merged and two classifications which are intra macro block and inter macro block are subdivided to many sub-types by different types of compression standards. These sub-types are merged to one macro block classification mb_type which has two classification of intra macro block and inter macro block and the processed classification of the macro block is marked as block_type. Moreover, different classification of the macro block mb_type may change the remapping for the total number of bits mb_bits of macro blocks.

The total number of bits mb_bits of the macro block is remapped according to the quantization algorithm defined by compression standard. All kinds of compression standards have different quantitative curves and algorithms, such that different bit numbers mb_bits are generated after the quantifying and the coding of the macro block. Therefore, when the remapping is required, the different measurement of the macro block can be converted from quantization parameter related compression bits to the picture residual which is independent with the quantization parameter. Remapped residual bit number of the macro block is remarked as block_rsd. Method of the remapping is that the total number of bits mb_bits of all kinds of macro blocks by a weighted value W (QP) which form a monotonic increasing curve with the quantization coefficient. The curve is defined by quantization algorithm of each compression standard and influenced by the macro block classification mb_type, for example, intra macro block and inter macro block have different remapping curves.

When inter macro block is divided to many sub-macro blocks, MV is filtered and the filtering method for filtering motion vector MV can be performing weighted average to various sub-macro blocks or using maximum value, minimum value or medium value of the motion vectors of all sub-macro blocks, etc. In conclusion, one inter macro block only preserve one motion vector MV as its motion vector. It should notice that there is no information about motion vector in coding code stream when a macro block is an intra macro block, in this case, motion vector of the intra macro block can utilize the weighted average of the motion vectors of the macro blocks around this intra macro block. The motion vector of the filtered macro block is marked as block_mv.

An I picture reconstruction unit is configured to reconstruct I picture. Its implementation which belongs to mature technology is stipulated by all kinds of video compressed standard. P frame and B frame will not be reconstructed in the present invention, that is, I picture dose not generate drifting as it is used as a reference, such that some steps can be executed partly according to the video compression standard on the precondition that it has no serious influence on the quality of pictures, such as loop filtering of H.264 can be omitted.

An I picture motion analysis unit is configured to implement motion analysis on the I picture reconstructed by the I picture reconstruction unit. Current I picture and the I picture which has been decoded and reconstructed constitute a picture sequence, such that the motion analysis can be implemented using conventional video moving detection algorithm or background modeling object division algorithm base on pixel.

A user information inputting unit is configured to receive and store information inputted by users. The so-called user information means picture area designated by users to implement motion analysis, which is the location of all macro blocks in the whole picture or macro blocks in several picture regions. The so-called user information also includes motion directions interesting users in each macro block and sensitivity parameter of motion analysis which is utilized to calculate some subsequently processed threshold. The interesting area and direction can be respectively defaulted to be full screen area and any directions, and the sensitivity can also utilize defaulted recommendation value. These parameters need not to be inputted by users in this case.

A P picture or B picture motion analysis unit is configured to implement motion analysis on every macro block based on the macro information processed by the information processing unit, which includes background modeling, background model matching and determining whether user interested movement has happened in macro block using user information and model matching result. Then result of the determination is sent to a code stream conversion unit.

The code stream conversion unit is configured to accomplish code stream conversion operation.

Figure 19:
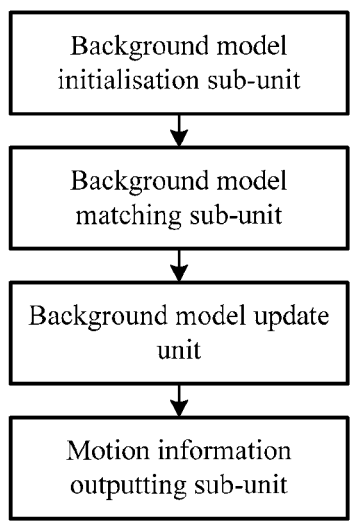
FIG. 19 shows a structure diagram of a code stream conversion apparatus based on video compression code stream in the tenth embodiment of the present invention.

As a preferable implementation in the present invention, FIG. 19 is a structure diagram of a code stream conversion apparatus based on video compression code stream in the tenth embodiment of the present invention. As shown in FIG. 19, the P picture or B picture motion analysis unit in the code stream conversion apparatus based on video compression code stream specifically includes following sub-units:

A background model initialization sub-unit is configured to initialize background model parameter before implementing motion analysis to the first picture of P frame or B frame. The background model parameter of every macro block includes background residual mean value bg_avg_rsd, whose initialization value is a positive number, such as utilizing block_rsd of current macro block of the first picture.

A background model matching sub-unit is configured to calculate difference rsd_dif between current macro block block_rsd and background bg_avg_rsd. Absolute difference rsd_dif=|block_rsd−bg_avg_rsd| of both is utilized in the measure method of rsd_dif, but it is not restrict to this measure method. If rsd_dif is greater than predetermined threshold TH1, the current macro block is determined to be a moving macro block; otherwise absolute value mv_abs of the motion vector block my of current macro block is calculated and then whether mv_abs is smaller than predetermined threshold TH2 is determined. If mv_abs is smaller than predetermined threshold TH2, the current macro block is determined to be a static macro block; otherwise whether rsd_tif is greater than threshold TH3 is determined. If rsd_tif is greater than threshold TH3, the current macro block is determined to be a moving macro block; otherwise the current macro block is determined to be a static macro block. The so-called motion vector absolute value calculating method is a measure method for measuring size of the motion vector.

A background model update unit is configured to update background model parameter after completing motion determination of a macro block. A preferable updating scheme of the background model parameter bg_avg_rsd is performing weighted average to time-domain block_rsk of the macro block in current location.

A motion information outputting sub-unit is configured to output motion information using user information and matching result of the background model matching sub-unit. If a macro block is determined to be a moving macro block in the background model matching sub-unit, whether the macro block is in the user interested area and whether its motion direction is user interested motion direction are determined. At last, the determined motion information is sent to the background model matching sub-unit.

In video monitoring area, moving object in picture and its characteristics are often concerned by users, however, pictures of many monitoring scenes in which moving object dose not exists most of the time or motion characteristics of the moving object do not interest users. Thus, if most of static code streams are discarded and code stream fragments which happens interesting movement are saved at this time, the storage space and network bandwidth required by the code stream storing and sending are largely reduced, which is also an advantages of the code stream conversion apparatus based on the motion analysis of the present invention.

The fifth embodiment is the method embodiment corresponding to this embodiment, and this embodiment and the fifth embodiment can be implemented in cooperation with each other. Correlated technical details disclosed in the fifth embodiment are still effective in this embodiment and will not be repeated here in order to reduce duplication. Correspondingly, correlated technical details disclosed in this embodiment can also be applied in the fifth embodiment.

It should be explained that the units or modules disclosed in the system embodiments of this invention are logic units or modules, physically, a logic unit or module can be a physical unit or module, or a portion of a physical unit or module, or implemented in combination of several physical units or modules, and physical implementing methods for these logic units or modules themselves are not the most important, instead, the combination of the functions achieved by these logic units or modules is the key to solving the technical problem disclosed in this invention. In addition, for highlighting creative portion of this invention, the above system embodiments of this invention do not introduce the units or modules which are not related closely to solving the technical problem to disclose in this invention, which does not indicate that the above system embodiments do not include other units or modules.

By referring to some preferred embodiments of this invention, this invention has been illustrated and described. But it should be understood to those skilled in the art that various other changes in the forms and details may be made without departing from the principles and scope of the invention.

What claimed is:

1. A motion analysis method based on video compression code stream, wherein includes following steps:
   a total number of bits or a residual bit number of a macro block in a video frame is extracted from video compression code stream;
   after the extraction, the total number of bits or the residual bit number of a macro block is remapped to the total number of bits or the residual number being independent with quantization parameter according to quantization algorithm defined by compression standard of the video compression code stream;
   weighted average is performed to the total number of bits or the residual bit number of macro blocks whose positions correspond with the current macro block in the latest M frames and a background value is obtained through calculating, in which M is a natural number;
   difference value between the total number of bits or the residual bit number of the current macro block and the background value is calculated, and then a moving object is determined that has been detected if the difference is greater than predetermined first threshold.

2. A motion analysis method based on video compression code stream according to claim 1, wherein before the step of the remapping, the method includes following steps:
classification of the macro block is merged into inter macro block and intra macro block according to the compression standard of the video compression code stream;
in the step of the remapping, the total number of bits or the residual bit number of the macro block is remapped to the total number of bits or the residual bit number being independent with the quantization parameter according to the quantization algorithm defined by the compression standard of the video compression code stream and the classification of the macro block.

3. A motion analysis method based on video compression code stream according to claim 1, wherein the weighted average to residual bit number of the macro blocks whose positions correspond with the current macro block in latest M frames can be performed by following mode:

$$bg\_avg\_rsd(k)=\Sigma_{i=0}^{m-1}\omega(k-i)\times block\_rsd(k-i)$$

wherein, bg_avg_rsd(k) indicates that the residual bit number of the macro blocks whose positions correspond with the current macro block in latest M frames is the residual bit number having been weighted average, k indicates current moment in time domain, block_rsd(k−i) indicates residual bit number of macro blocks having the same position in former moment i of time-domain, m is a positive integer and indicates to perform weighted average to the residual bit number of the macro blocks whose positions correspond with M frames, $\omega(k-i)$ is the weight of the residual bit number of the macro blocks whose positions correspond with M frames and needs to meet the condition of $\Sigma_{i=0}^{m-1}\omega(k-i)=1$ and $\omega(k-i)\geq 0$ is satisfied.

4. A motion analysis method based on video compression code stream according to claim 1, wherein before the step that difference value between the total number of bits or the residual bit number of the current macro block and the background value is calculated, the method further includes following step:
a motion vector of a macro block in a video frame is extracted from video compression code stream;
after the step that difference value between the total number of bits or the residual bit number of the current macro block and the background value is calculated, the method further includes following step:
a moving object is determined that has been detected if the difference is greater than predetermined third threshold and the motion vector of the current macro block is greater than predetermined second threshold, in which the predetermined first threshold is greater than or equal to the predetermined third threshold.

5. A motion analysis method based on video compression code stream according to claim 4, wherein before the step that a motion vector of a macro block in a video frame is extracted from video compression code stream, the method further includes following step:
classification of the macro block is merged into inter macro block and intra macro block according to the compression standard of the video compression code stream;
the step that a motion vector of a macro block in a video frame is extracted from video compression code stream further includes following sub-steps:
weighted average is performed to motion vectors of all sub-macro blocks to obtain the motion vector of the current macro block when the current macro block is an inter macro block and has been divided to multiple sub-macro blocks;
weighted average is performed to motion vectors of inter macro blocks around the intra macro block to obtain the motion vector of the current macro block when the current macro block is an intra macro block.

6. A motion analysis method based on video compression code stream according to claim 1, wherein before the step that a background value is obtained through calculating, the method further includes following steps:
whether the current macro block is the macro block in designated area is determined and then if the current macro block is the macro block in designated area, the step that a background value is obtained through calculating is executed, otherwise detection for the current macro block ends.

7. A motion analysis method based on video compression code stream according to claim 5, wherein before the step that a background value is obtained through calculating, the method further includes following steps:
whether the angle between direction of the motion vector of current macro block and the designated direction is smaller than a predetermined threshold is determined and then the step that a background value is obtained through calculating is executed if the angle is smaller than the predetermined threshold, otherwise detection for the current macro block ends.

8. A motion analysis method based on video compression code stream according to claim 1, wherein before the step that a total number of bits or a residual bit number of a macro block in a video frame is extracted from video compression code stream, the method further includes following steps:
classification of the current frame is determined;
if the current frame is a B frame or a P frame, then the step that a total number of bits or a residual bit number of a macro block of a video frame is extracted from video compression code stream is executed;
if the current frame is an I frame, the picture of I frame is reconstructed and then the motion analysis is implemented according to the reconstructed picture of I frame.

9. A code stream conversion method based on video compression code stream, wherein includes following steps:
the motion analysis is implemented on video compression code stream according to the motion analysis method of claim 1;
if the motion analysis has determined that a moving object has been detected, code stream in group of picture of the detected moving object is outputted, otherwise only code stream of pictures represented I frame in group of picture of undetected moving object is outputted.

10. A motion analysis apparatus based on video compression code stream, wherein includes following units:
a first extraction unit is configured to extract a total number of bits or a residual bit number of a macro block in a video frame from video compression code stream;
a remapping unit is configured to remap the total number of bits or the residual bit number of the macro block extracted in the first extraction unit to the total number of bits or the residual bit number being independent with quantization parameter according to quantization algorithm defined by compression standard of the video compression code stream;
a weighting unit is configured to perform weighted average to the total number of bits or the residual bit number of macro blocks whose positions correspond with current macro block in latest M frames and to obtain a background value through calculating, in which M is a natural number;
a calculation unit is configured to calculate difference value between the total number of bits or the residual bit number of the current macro block and the background value obtained from the weighting unit through calculating;
a first determination unit is configured to determine whether the difference value calculated by the calculation unit is greater than predetermined first threshold, and then determine that a moving object has been detected if the difference value is greater than the predetermined first threshold.

11. A motion analysis apparatus based on video compression code stream according to claim 10, wherein further includes following unit:
a first merging unit is configured to merge classification of the macro block into inter macro block and intra macro block according to the compression standard of video compression code stream;
the remapping unit is further configured to remap the total number of bits or the residual bit number of the macro block to the total number of bits or the residual bit number being independent with the quantization quantity according to the quantization algorithm defined by the compression standard of the video compression code stream and the classification of the macro block merged by the first merging unit.

12. A motion analysis apparatus based on video compression code stream according to claim 10, wherein the weighted average of the weighting unit to the residual bit number of the macro blocks whose positions correspond with the current macro block in latest M frames can be performed by the following method:

$$bg\_avg\_rsd(k)=\Sigma_{i=0}^{m-1}\omega(k-i)\times block\_rsd(k-i)$$

wherein, bg_avg_rsd(k) indicates that the residual bit number of the macro blocks whose positions correspond with the current macro block in latest M frames is the residual bit number having been weighted average, k indicates current moment in time domain, block_rsd(k−i) indicates residual bit number of macro blocks having the same position in former moment i of time-domain, m is a positive integer and indicates to perform weighted average to the residual bit number of the macro blocks whose positions correspond with M frames, $\omega(k-i)$ is the weight of the residual bit number of the macro blocks whose positions correspond with M frames and needs to meet the condition of $\Sigma_{i=0}^{m-1}\omega(k-i)=1$ and $\omega(k-i) \geq 0$.

13. A motion analysis apparatus based on video compression code stream according to claim 10, wherein further includes following units:
a second extraction unit is configured to extract a motion vector of a macro block in a video frame from video compression code stream;
a second determination unit is configured to determine whether the motion vector of the current macro block extracted by the second extraction unit is greater than predetermined second threshold;
a third determination unit is configured to determine whether the obtained difference value which is calculated by the calculation unit is greater than predetermined third threshold when the motion vector of the current macro block is determined to be greater than the predetermined second threshold by the second determination unit, and then determine that a moving object has been detected if the difference is greater than the predetermined third threshold, in which the predetermined first threshold is greater than or equal to the predetermined third threshold.

14. A motion analysis apparatus based on video compression code stream according to claim 13, wherein further includes following units:
a second merging unit is configured to merge classification of the macro block into inter macro block and intra macro block according to the compression standard of the video compression code stream before the motion vector of the macro block in the video frame is extracted from the video compression code stream by the second extraction unit;
the second extraction unit includes following sub-modules:
a macro block classification determination sub-module is configured to determine that the current macro block is an inter macro block or an intra macro block merged by the first or second merging unit;
a sub-macro block classification determination sub-module is configured to determine whether the inter macro block is divided to multiple sub-macro blocks when the current macro block is determined to be an inter macro block by the macro block classification determination sub-module;
a first vector weighting sub-module is configured to perform weighted average to motion vectors of all sub-macro blocks to obtain the motion vector of the current macro block when the current macro block is determined to be an inter macro block by the macro block classification determination sub-module and the current macro block is determined that has been divided to multiple sub-macro blocks by the sub-macro block determination sub-module;
a second vector weighting sub-module is configured to perform weighted average to motion vectors of inter macro blocks around the intra macro block to obtain the motion vector of the current macro block when the current macro block is determined to be an intra macro block by the macro block classification determination sub-module.

15. A motion analysis apparatus based on video compression code stream according to claim 10, wherein further includes following unit:
an area determination unit is configured to determine whether the current macro block is the macro block in designated area before the background value is obtained through calculating by the weighting unit, and if the current macro block is the macro block in designated area, then the step that background value is obtained through calculating by the weighting unit is executed, otherwise detection for the current macro block ends.

16. A motion analysis apparatus based on video compression code stream according to claim 14, wherein further include:
a direction determination unit is configured to determine whether the angle between direction of the motion vector of current macro block and the designated direction is smaller than a predetermined threshold before the background value is obtained through calculating by the weighting unit, and if the angle is smaller than the predetermined threshold, the step that background value is obtained through calculating by the weighting unit is executed, otherwise detection for the current macro block ends.

17. A motion analysis apparatus based on video compression code stream according to claim 10, wherein further includes:
- a frame classification determination unit is configured to determine classification of the current frame and if the current frame is determined to be a B frame or P frame by the frame classification determination unit, then the step that a total number of bits or a residual bit number of a macro block in a video frame from video compression code stream is executed by the first extraction unit;
- a reconstruction unit is configured to reconstruct the picture of I frame if the current frame is determined to be an I frame by the frame classification determination unit;
- an I frame motion analysis unit is configured to implement motion analysis according to the picture of the I frame reconstructed by the reconstruction unit.

18. A code stream conversion apparatus based on video compression code stream, wherein includes following sections:
- a motion analysis apparatus according to claim 10;
- a motion code stream outputting unit is configured to output code stream in group of picture of the detected moving object if the motion analysis of the motion analysis apparatus has determined that a moving object has been detected, otherwise output code stream of pictures represented I frame in group of picture of undetected moving object.

* * * * *